United States Patent
Vitas et al.

(10) Patent No.: US 12,017,885 B2
(45) Date of Patent: *Jun. 25, 2024

(54) TAPE MEASURE WITH EPICYCLIC GEAR DRIVE FOR TAPE RETRACTION

(71) Applicant: Milwaukee Electric Tool Corporation, Brookfield, WI (US)

(72) Inventors: Jonathan F. Vitas, Muskego, WI (US); Devin W. Herritz, Sussex, WI (US); Scott Earl McKinster, Watertown, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/872,765

(22) Filed: Jul. 25, 2022

(65) Prior Publication Data
US 2022/0363510 A1 Nov. 17, 2022

Related U.S. Application Data

(63) Continuation of application No. 17/097,535, filed on Nov. 13, 2020, now Pat. No. 11,427,434, which is a
(Continued)

(51) Int. Cl.
*G01B 3/10* (2020.01)
*B65H 75/48* (2006.01)
(Continued)

(52) U.S. Cl.
CPC .............. *B65H 75/486* (2013.01); *F16H 1/46* (2013.01); *G01B 3/1005* (2013.01);
(Continued)

(58) Field of Classification Search
CPC ....... B25H 75/486; F16H 1/46; G01B 3/1003; G01B 3/1041; B01B 3/1056
(Continued)

(56) References Cited

U.S. PATENT DOCUMENTS 1,057,543 A 4/1913 Green
1,110,759 A 9/1914 Earll
(Continued)

FOREIGN PATENT DOCUMENTS

CN 87206970 12/1987
CN 2092740 1/1992
(Continued)

OTHER PUBLICATIONS

DeWalt website material, 100 ft Auto Retractable Long Tape, available at http://www.dewalt.com/en-us/products/hand-tools/measuring-and-layout-tools/100-ft-auto-retractable-long-tape/dwht34201, illustrating products publicly available at least by Sep. 20, 2017, 2 pages.
(Continued)

*Primary Examiner* — George B Bennett
(74) *Attorney, Agent, or Firm* — Reinhart Boerner Van Deuren s.c.

(57) ABSTRACT

A tool, such as a tape measure, including a spring-based retraction system is shown. The retraction system utilizes an epicyclic gear train coupled between the tape blade winding reel and a rotating arbor or axle within the tape measure. A spiral spring has an outer end coupled to the reel and an inner end coupled to the axle. The gear train may be a reduction gear train such that the axle rotates slower than the reel. By coupling the spiral spring between the gear train input and gear train output, high energy density springs may be used, which may allow for decrease in housing size, increase in tape length or thickness for a given housing size, and/or advantageous retraction speed control.

20 Claims, 23 Drawing Sheets

Related U.S. Application Data continuation of application No. 15/927,745, filed on Mar. 21, 2018, now Pat. No. 10,836,603, which is a continuation of application No. PCT/US2018/023391, filed on Mar. 20, 2018.

(60) Provisional application No. 62/598,890, filed on Dec. 14, 2017, provisional application No. 62/474,872, filed on Mar. 22, 2017.

(51) Int. Cl.
    *F16H 1/46*     (2006.01)
    *G01B 3/1005*     (2020.01)
    *G01B 3/1041*     (2020.01)
    *G01B 3/1056*     (2020.01)

(52) U.S. Cl.
    CPC ......... *G01B 3/1041* (2013.01); *G01B 3/1056* (2013.01); *G01B 2003/1023* (2013.01); *G01B 2003/103* (2013.01)

(58) Field of Classification Search
    USPC .......................................................... 33/769
    See application file for complete search history.

(56) References Cited

U.S. PATENT DOCUMENTS

| | | | |
|---|---|---|---|
| 1,119,887 A | | 12/1914 | Shanahan |
| 1,203,562 A | | 11/1916 | Adamson |
| 2,437,786 A | | 9/1945 | Oberdorf |
| 2,543,176 A | | 2/1951 | Komassa |
| 3,054,573 A | | 9/1962 | Spencer |
| 3,812,589 A | | 5/1974 | Schultheis |
| 3,929,210 A | | 12/1975 | Cutler et al. |
| 4,026,494 A | | 5/1977 | Tanaka |
| 4,113,200 A | | 9/1978 | Tanaka |
| 4,189,107 A | | 2/1980 | Mabo |
| 4,205,808 A | | 6/1980 | Hurtig et al. |
| 4,303,208 A | | 12/1981 | Tanaka |
| 4,402,472 A | | 9/1983 | Burtscher |
| 4,551,847 A | * | 11/1985 | Caldwell ................ G01D 5/363 377/24 |
| 4,756,087 A | | 7/1988 | Sing |
| 5,042,159 A | | 8/1991 | Millen |
| 5,440,820 A | | 8/1995 | Hwang |
| 5,448,837 A | | 9/1995 | Han-Teng |
| 5,471,761 A | | 12/1995 | Cheng |
| 5,820,057 A | | 10/1998 | Decarolis et al. |
| 5,875,987 A | | 3/1999 | Pullen |
| 6,134,801 A | | 10/2000 | Miyasaka |
| 6,295,740 B1 | | 10/2001 | Mitchell |
| 6,349,482 B1 | | 2/2002 | Gilliam |
| 6,464,160 B2 | | 10/2002 | Hsu |
| 6,550,155 B1 | | 4/2003 | Hsu |
| 6,868,620 B2 | | 3/2005 | Sanoner |
| 7,024,790 B1 | | 4/2006 | Qilian |
| 7,096,596 B2 | | 8/2006 | Hernandez et al. |
| 7,263,784 B1 | | 9/2007 | Lee |
| 7,293,367 B1 | | 11/2007 | Zhu |
| 7,374,125 B2 | | 5/2008 | Lin |
| 7,398,604 B2 | | 7/2008 | Murray |
| 7,475,842 B2 | * | 1/2009 | Campbell ............ G01B 3/1005 242/390.8 |
| 7,559,154 B2 | * | 7/2009 | Levine ................ G01B 3/1005 33/761 |
| 7,584,549 B2 | | 9/2009 | Lee |
| 8,117,763 B2 | | 2/2012 | Delneo et al. |
| 8,584,373 B2 | | 11/2013 | Murray et al. |
| 9,207,058 B2 | | 12/2015 | Delneo et al. |
| 9,719,764 B2 | * | 8/2017 | Chiu ................... G01B 3/1041 |
| 9,874,428 B1 | | 1/2018 | Nelson et al. |
| 10,132,605 B2 | | 11/2018 | Nelson |
| 10,836,603 B2 | * | 11/2020 | Vitas ................... G01B 3/1041 |
| 11,226,187 B2 | * | 1/2022 | Vitas ................... G01B 3/1005 |
| 11,427,434 B2 | * | 8/2022 | Vitas ................... G01B 3/1041 |
| 2001/0038055 A1 | | 11/2001 | Hsu |
| 2004/0035017 A1 | | 2/2004 | Yang |
| 2004/0035971 A1 | | 2/2004 | Li |
| 2006/0096113 A1 | | 5/2006 | Kang et al. |
| 2006/0254070 A1 | | 11/2006 | Huang |
| 2007/0186433 A1 | | 8/2007 | Campbell |
| 2008/0086904 A1 | | 4/2008 | Murray |
| 2010/0212175 A1 | | 10/2010 | Choi |
| 2011/0179661 A1 | | 7/2011 | Delneo et al. |
| 2015/0247716 A1 | | 9/2015 | Craig et al. |
| 2016/0076866 A1 | | 3/2016 | Chiu |
| 2016/0290776 A1 | | 10/2016 | Hoppe et al. |
| 2018/0334354 A1 | | 11/2018 | Orsini et al. |

FOREIGN PATENT DOCUMENTS

| | | |
|---|---|---|
| CN | 2247326 | 2/1997 |
| CN | 1181496 | 5/1998 |
| CN | 2314340 | 4/1999 |
| CN | 2344751 | 10/1999 |
| CN | 2356309 | 12/1999 |
| CN | 2356310 | 12/1999 |
| CN | 2370385 | 3/2000 |
| CN | 2374839 | 4/2000 |
| CN | 2374840 | 4/2000 |
| CN | 2462345 | 11/2001 |
| CN | 2475990 | 2/2002 |
| CN | 2485625 | 4/2002 |
| CN | 2536986 | 2/2003 |
| CN | 1461938 | 12/2003 |
| CN | 2606327 | 3/2004 |
| CN | 1546939 | 11/2004 |
| CN | 1185459 | 1/2005 |
| CN | 2718508 | 8/2005 |
| CN | 2859447 | 1/2007 |
| CN | 2884130 | 3/2007 |
| CN | 1991292 | 7/2007 |
| CN | 101004345 | 7/2007 |
| CN | 200968838 | 10/2007 |
| CN | 200996820 | 12/2007 |
| CN | 201014950 | 1/2008 |
| CN | 201021887 | 2/2008 |
| CN | 101165452 | 4/2008 |
| CN | 101173846 | 5/2008 |
| CN | 201083476 | 7/2008 |
| CN | 201096485 | 8/2008 |
| CN | 101358826 | 2/2009 |
| CN | 101424504 | 5/2009 |
| CN | 100520273 | 7/2009 |
| CN | 201285261 | 8/2009 |
| CN | 101655340 | 2/2010 |
| CN | 101676678 | 3/2010 |
| CN | 201520567 | 7/2010 |
| CN | 201532159 | 7/2010 |
| CN | 201540069 | 8/2010 |
| CN | 201637362 | 11/2010 |
| CN | 101644556 | 5/2011 |
| CN | 102829681 | 12/2012 |
| CN | 102901415 | 1/2013 |
| CN | 102901416 | 1/2013 |
| CN | 202660994 | 1/2013 |
| CN | 203148328 | 8/2013 |
| CN | 203240971 | 10/2013 |
| CN | 203310318 | 11/2013 |
| CN | 103673803 | 3/2014 |
| CN | 203586971 | 5/2014 |
| CN | 203928924 | 11/2014 |
| CN | 203928926 | 11/2014 |
| CN | 203976134 | 12/2014 |
| CN | 204142110 | 2/2015 |
| CN | 204268991 | 4/2015 |
| CN | 105004231 | 10/2015 |
| CN | 105066805 | 11/2015 |
| CN | 105222661 | 1/2016 |
| CN | 204944336 | 1/2016 |
| CN | 204963699 | 1/2016 |
| CN | 105318795 | 2/2016 |
| CN | 205403630 | 7/2016 |

(56) References Cited

FOREIGN PATENT DOCUMENTS

| | | |
|---|---|---|
| CN | 205403635 | 7/2016 |
| CN | 105856165 | 8/2016 |
| CN | 205426006 | 8/2016 |
| CN | 205879028 | 1/2017 |
| CN | 206488711 | 9/2017 |
| DE | 10311105 | 9/2004 |
| DE | 10306340 | 12/2004 |
| DE | 10319907 | 4/2005 |
| EP | 0022230 | 5/1984 |
| EP | 1044350 | 10/2000 |
| EP | 1074813 | 2/2001 |
| JP | H04-1402 | 1/1992 |
| JP | H06-2102 | 1/1994 |
| JP | H06-28602 | 4/1994 |
| JP | H07301501 | 11/1995 |
| JP | 3131093 | 4/2007 |
| KR | 20-0279487 | 6/2002 |
| KR | 10-1315057 | 10/2013 |
| TW | 200606400 A | 2/2006 |
| TW | M298110 | 9/2006 |
| TW | 200831851 A | 8/2008 |
| TW | 200848697 A | 12/2008 |
| TW | 200905161 A | 2/2009 |
| TW | 201812242 A | 4/2018 |
| WO | WO9714541 | 4/1997 |
| WO | WO9923447 | 5/1999 |
| WO | WO03010485 | 2/2003 |
| WO | WO03074235 | 9/2003 |
| WO | WO03085353 | 10/2003 |
| WO | WO03096839 | 11/2003 |
| WO | WO2004-037348 | 5/2004 |
| WO | WO04056269 | 7/2004 |
| WO | WO05085747 | 9/2005 |
| WO | WO05108909 | 11/2005 |
| WO | WO07059353 | 5/2007 |
| WO | WO08083416 | 7/2008 |
| WO | WO08141614 | 11/2008 |
| WO | WO08145101 | 12/2008 |
| WO | WO09110879 | 9/2009 |
| WO | WO11047440 | 4/2011 |
| WO | WO12082034 | 6/2012 |
| WO | WO12142102 | 10/2012 |
| WO | WO15194841 | 12/2015 |
| WO | WO16148504 | 9/2016 |
| WO | WO16161452 | 10/2016 |
| WO | WO16164725 | 10/2016 |

OTHER PUBLICATIONS

DeWalt website material, 100 ft. Steel Auto-Rewind Long Tape, available at http://www.homedepot.com/p/DEWALT-100-ft-Steel-Auto-Rewind-Long-Tape-DWHT34201/202710450?keyword=DWHT34201, illustrating products publicly available at least by Sep. 20, 2017, 3 pages.

International Search Report and Written Opinion for International Application No. PCT/US2018/023391 dated Jul. 10, 2018, 12 pages.

Extended European Search Report for European Application No. 17859126.9, dated May 11, 2020, 21 pages.

International Search Report and Written Opinion for International Application No. PCT/US2017/055166 dated Jan. 22, 2018, 47 pages.

\* cited by examiner

TAPE MEASURE WITH EPICYCLIC GEAR DRIVE FOR TAPE RETRACTION

CROSS-REFERENCE TO RELATED PATENT APPLICATIONS

This application is a continuation of U.S. application Ser. No. 17/097,535, filed Nov. 13, 2020, which is a continuation of U.S. application Ser. No. 15/927,745, now U.S. Pat. No. 10,836,603, filed Mar. 21, 2018, which is a continuation of PCT/US2018/023391, filed Mar. 20, 2018, which claims priority to and the benefit of U.S. Provisional Application No. 62/474,872, filed Mar. 22, 2017, and U.S. Provisional Application No. 62/598,890, filed Dec. 14, 2017, each of which are incorporated herein by reference in their entireties.

BACKGROUND OF THE INVENTION

The present invention relates generally to the field of tools. The present invention relates specifically to a tape measure, measuring tape, retractable rule, etc., that includes a spring-based retraction system having a gear train located between a tape reel and a rotatable axle and a spiral spring coupled between the reel and the rotatable axle.

Tape measures are measurement tools used for a variety of measurement applications, including in the building and construction trades. Some tape measures include a graduated, marked blade wound on a reel and also include a retraction system for automatically retracting the blade onto the reel. In some typical tape measure designs, the retraction system is driven by a coil or spiral spring that is tensioned, storing energy as the tape is extended, and that releases energy to spin the reel, winding the blade back onto the reel.

SUMMARY OF THE INVENTION

One embodiment of the invention relates to a tape measure with a spring-based retraction system including a reel and a spiral spring. The spiral spring includes an outer end coupled to the reel and an inner end that is coupled to an axle. Both the axle and reel are rotatably mounted within the tape measure housing. A gear train is coupled between the reel and the axle. The gear train may be configured such that every rotation of the reel during tape extension results in less than one rotation of the axle. The gear train may be an epicyclic gear train having a central rotational axis aligned with a rotational axis of the axle.

In some embodiments, the outer end of the spring is directly coupled to an inner surface of the reel. In some such embodiments, no additional structure is located radially between the outer end of the spring and the inner surface of the reel. In some embodiments, during tape extension and/or retraction, the outer end of the spring has an angular velocity greater than the angular velocity of the inner end of the spring.

In some embodiments, the gear ratio of the gear train is greater than 1 and less than 2. In some embodiments, the gear train defines a spring turn ratio, defined as the number of reel rotations per turn applied to the spring, and in some embodiments the spring turn ratio is 2 to 10, is 3 to 6, is 3 to 4, is 4 to 5, is 5 to 6 and/or is 3.5 to 4.5.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Figure 1:
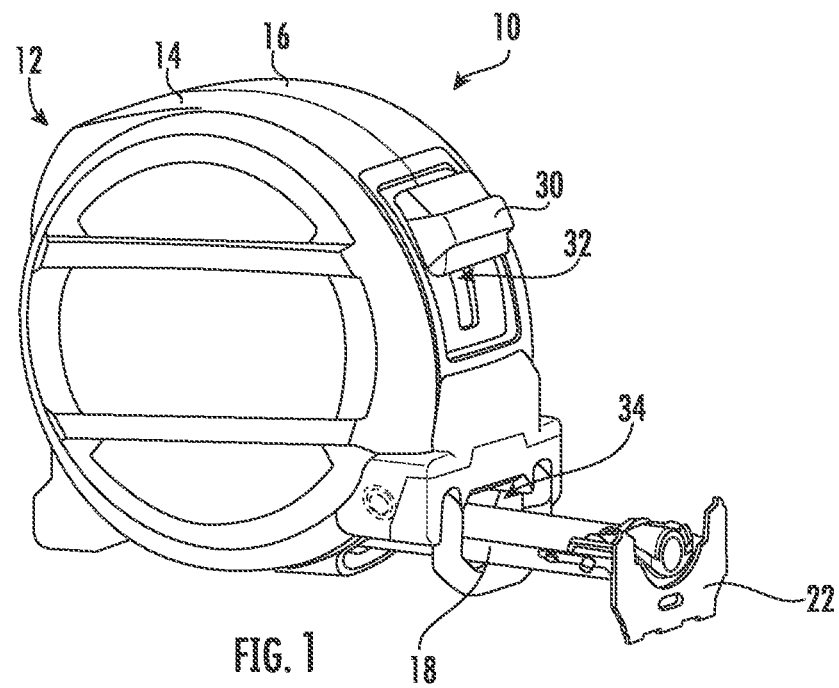
FIG. 1 is a perspective view of a tape measure including a geared retraction control system, according to an exemplary embodiment.

Referring generally to the figures, various embodiments of a tape measure are shown. Various embodiments of the tape measure discussed herein include an innovative retraction system designed to provide for a variety of desired retraction characteristics, including controlled/reduced retraction speed. Some tape measure blades are susceptible to damage/breakage due to high speed during retraction. For example, high speeds during retraction may cause the tape blade to whip (e.g., the tendency of the tape measure blade to bend or snap back on itself during fast retraction), which can crack or tear the tape blade, and similarly, high retraction speeds can damage the tape blade when the tape hook contacts the tape housing at the end of retraction. Applicant believes that the tape measure retraction system described herein provides for retraction speed control that can limit such sources of tape measure damage while at the same time providing a more compact tape measure without sacrificing tape length or retraction performance.

As will generally be understood, in certain tape measure designs, a spring stores energy during tape blade extension and applies a force/torque to a reel causing the tape blade to wind on to the reel during tape blade retraction. Various aspects of spring design, such as spring energy, torque profile, spring constant, etc., are selected to ensure that operation of the spring has enough energy to provide satisfactory tape retraction. However, because of the physics and characteristics of the typical tape measure spiral spring, in order to ensure full tape retraction at a satisfactory speed, the typical tape measure spiral spring delivers excess energy to the tape blade during retraction, which in turn translates into undesirably highly retraction speeds and whip, particularly toward the end of retraction. In addition, for a given spiral spring design increasing spring energy to provide for retraction of longer, wider and/or thicker measuring tape blades typically requires use of a larger spiral spring, which in turn results in a larger tape measure.

As discussed herein, Applicant has developed various innovative tape measure blade retraction systems that provide a desired level of spring energy while utilizing a relatively short or small volume spring, while maintaining a relatively small tape measure housing (e.g., a tape measure outer diameter) and/or while providing desired retraction characteristics. As discussed in more detail, the tape retraction system discussed herein utilizes a gear train having its input coupled to a rotating tape reel, the output coupled to a rotating central arbor or axle, and one portion coupled to a stationary tape measure housing. The tape retraction system also includes a spring, such as a spiral spring, coupled at its inner end to the rotating axle and at its outer end to the rotating tape reel. In general, the gear train is a reduction gear train that translates each rotation of the tape reel to less than one rotation of the axle, and both the tape reel and the axle rotate together during tape extension and retraction.

As compared to a gear reduction arrangement in which the input of a gear train is coupled to the tape reel and the output of the gear train is coupled to the outer end of the spiral spring, the gear train arrangement discussed herein provides for space savings within the reel, which can be utilized to further decrease spring size, allowing housing size to be decreased. Alternatively, the space savings provided by the retraction system arrangements discussed herein can be utilized to increase spring energy for a fixed housing size, which allows for a longer tape blade to be deployed within a smaller tape housing than would typically be needed to accommodate the longer tape length. As will be understood from the description below, the gear train operates in one direction during tape measure extension as the reel drives winding of the spiral spring, and the gear train operates in the opposite direction during tape measure retraction as the expanding spiral spring drives rotation of the reel and tape blade uptake. As used herein, the directionality of the gear train (e.g., input and output) refers to operation of the gear train during tape extension, with the understanding that the gear train operates in the opposite direction during tape blade retraction.

Figure 2:
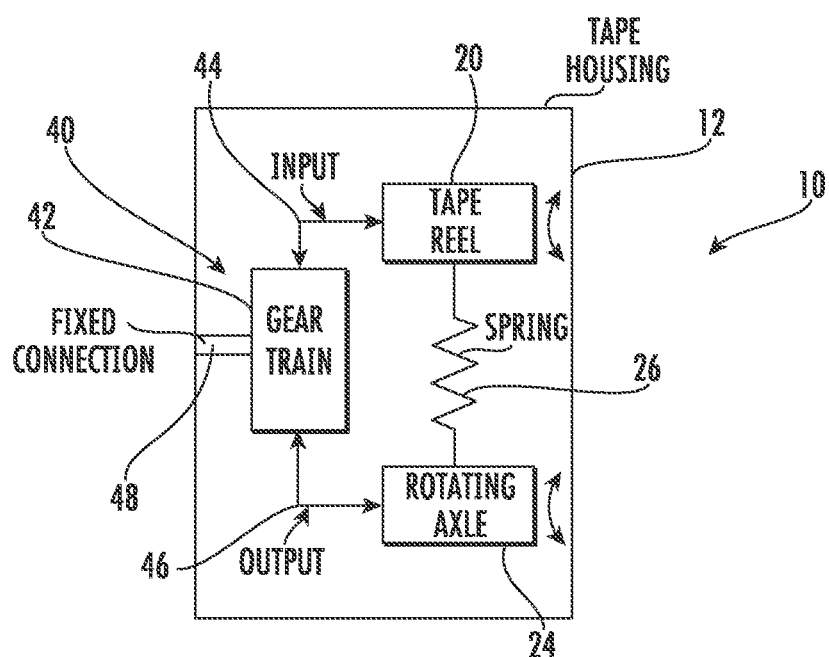
FIG. 2 is a schematic view of a gear retraction control system for a tape measure, according to an exemplary embodiment.
Figure 3:
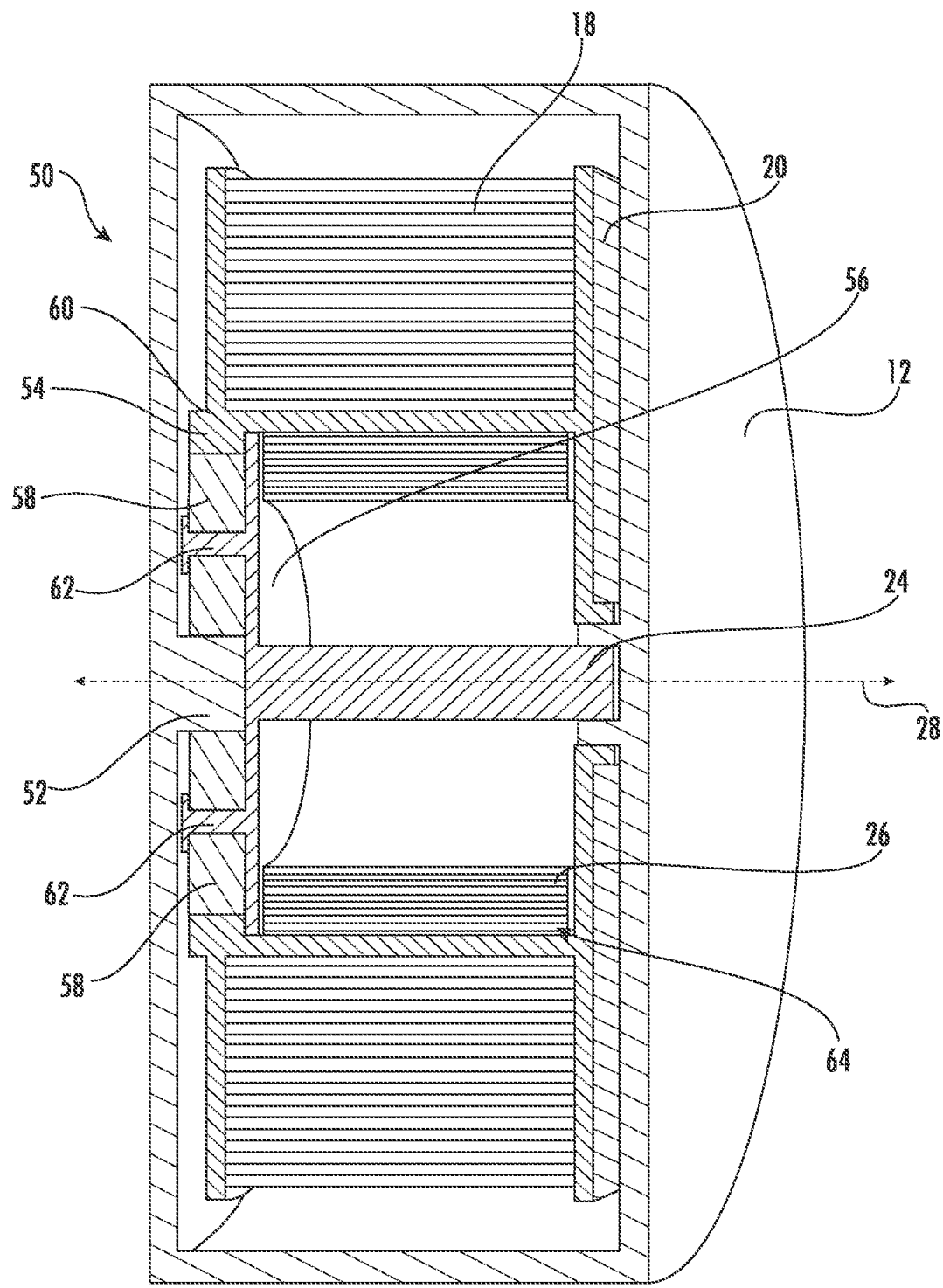
FIG. 3 is a cross-sectional perspective view of a tape measure including a geared retraction control system, according to an exemplary embodiment.

Referring to FIGS. 1-3, a length measurement device, tape measure, measuring tape, retractable rule, etc., such as tape measure 10, is shown according to an exemplary embodiment. In general, tape measure 10 includes a housing 12 having a first part 14 and a second part 16. Tape measure 10 includes a tape blade 18 and, in the retracted position shown in FIGS. 1 and 2, tape blade 18 is wound or coiled onto a tape reel 20. In general, tape blade 18 is an elongated strip of material including a plurality of graduated measurement markings, and in specific embodiments, tape blade 18 is an elongated strip of metal material (e.g., steel material) that includes an outer most end coupled to a hook assembly 22. Tape blade 18 may include various coatings (e.g., polymer coating layers) to help protect tape blade 18 and/or the graduated markings of the blade from wear, breakage, etc.

In general, tape reel 20 is rotatably mounted within housing 12 and positioned around an axle 24. As will be explained in more detail below, axle 24 is rotatably mounted within housing 12 such that axle 24 is allowed to rotate relative to housing 12 during tape extension or retraction.

As shown schematically in FIG. 2, tape measure 10 includes a retraction system 40 that includes a spring, shown as spiral spring 26. In general, spiral spring 26 is coupled between axle 24 and tape reel 20 (or through tape reel 20 to directly couple to an inner end of tape 18) such that spiral spring 26 is coiled or wound to store energy during extension of tape 18 from housing 12 and is unwound, releasing energy, driving rewinding of tape 18 onto tape reel 20 during retraction of tape 18 (e.g., following release or unlocking of the tape 18). Specifically, when tape blade 18 is unlocked or released, spring 26 expands, driving tape reel 20 to wind up tape blade 18 and to pull tape blade 18 back into housing 12.

As shown in FIG. 3, the non-extended portion of tape 18 is wound onto a reel 20, which is surrounded by housing 12. Reel 20 is rotatably disposed about an axis 28 of tape measure 10, and spring 26 is coupled to reel 20 and configured to drive reel 20 about rotation axis 28, which in turn provides powered retraction of tape blade 18. Referring to FIG. 1, a tape lock 30 is provided to selectively engage tape blade 18, which acts to hold tape blade 18 and reel 20 in place such that an extended segment of tape blade 18 remains at a desired length.

A slot 32 is defined along a forward portion of housing 12. Slot 32 provides an opening in the tape measure housing 12, which allows tape lock 30 to extend into housing 12 and to engage with tape 18 or reel 20. In addition, slot 32 provides a length sufficient to allow tape lock 30 to be moved relative to housing 12 between locked and unlocked positions. Below slot 32, a tape port 34 is provided in tape housing 12. In one embodiment, tape port 34 has an arcuate shape, corresponding to an arcuate cross-sectional profile of tape blade 18. Tape port 34 allows for the retraction and extension of tape blade 18 into and from housing 12 during tape extension and retraction.

Referring to FIG. 2, a schematic view of tape measure 10 including retraction system 40 is shown. In general, retraction system 40 includes a gear train 42. Gear train 42 includes an input 44 that is coupled to tape reel 20 and an output 46 that is coupled to rotating axle 24. In particular embodiments, gear train 42 is a reduction gear train that provides gear reduction between tape reel 20 and axle 24 such that for each rotation of tape reel 20 (e.g., during tape extension), axle 24 experiences less than one rotation. In specific embodiments, the gear reduction provided by gear train 42 is at least 21 reel turns to 20 axle turns (21/20), specifically at least 11 reel turns to 10 axle turns (11/10), and more specifically at least 8 reel turns to 7 axle turns (8/7). In a specific embodiment, gear train 42 provides a gear reduction of 6 reel turns to 5 axle turns (6/5).

In specific embodiments, both reel 20 and axle 24 are rotating in the same direction, which in turn causes the inner end of spring 26 (coupled to axle 24) and the outer end of spring 26 (coupled to reel 20) to rotate in the same direction as each other. Thus, by coupling spring 26 between two rotating portions of retraction system 40, the number of turns that spring 26 experiences per rotation of reel 20 is substantially greater than the number of rotations axle 24 experiences per rotation of reel 20. As will be understood, while the specifics of the gear reduction calculation will vary based on the specific gear arrangement used, the following formula defines the spring turn ratio of the various gear trains discussed herein:

$$\text{Spring Turn Ratio} = \frac{\text{\# of reel turns}}{\text{\# of turns applied to spring}} \quad \text{Equation 1}$$
$$= \frac{1}{1 - \frac{1}{\text{Gear Ratio}}}$$
$$= \frac{1}{1 - \frac{\text{\# of axle turns}}{\text{\# of reel turns}}}$$

In this manner, by providing gear reduction between tape reel 20 and axle 24, and by locating spring 26 between the rotating input and output of gear train 42, the number of turns spring 26 experiences for each rotation of reel 20 can be decreased by utilizing a gear train with a relatively low gear ratio. By decreasing the number of turns of spring 26 (as compared to a standard spiral spring) needed to achieve full extension of tape blade 18 from reel 20, spring 26 can be formed from stiffer material that is more energy dense (spring energy stored per unit volume occupied by the spring) than a spring compliant enough to experience a high number of turns. In specific embodiments, gear train 42 is configured such that the Spring Turn Ratio is greater than 1, is 2 to 10, is 3 to 6, is 3 to 4, is 4 to 5, is 5 to 6 or is 3.5 to 4.5. In one specific embodiment, the Spring Turn Ratio of gear train 42 is 3.95 to 4.05, and in another specific embodiment, the Spring Turn Ratio of gear train 42 is between 5.5 and 6.5, and specifically is 6. Applicant believes that retraction control systems having spring turn ratios within these ranges generally provide satisfactory torque profiles and spring sizes for tape measure applications.

Thus, retraction system 40 allows for a desired level of torque/energy to be delivered by spiral spring 26 while decreasing the total volume of spiral spring 26 (e.g., reducing width or length of spring 26). In specific embodiments, by reducing the total length of spiral spring 26, the diameter of spiral spring 26 can be reduced as compared to a tape measure retraction system with the same torque/energy needs but does not utilize gear reduction as discussed herein. Further, by utilizing retraction system 40 with the gear train arrangements discussed herein, spring 26 is coupled at its outer end directly to reel 20, which eliminates the need for additional transmission elements to be located within reel 20 to effect the coupling between the spring and the gear system. This extra volume can be used for additional spring size or for additional tape length while maintaining a selected outer tape measure housing.

Figure 4:
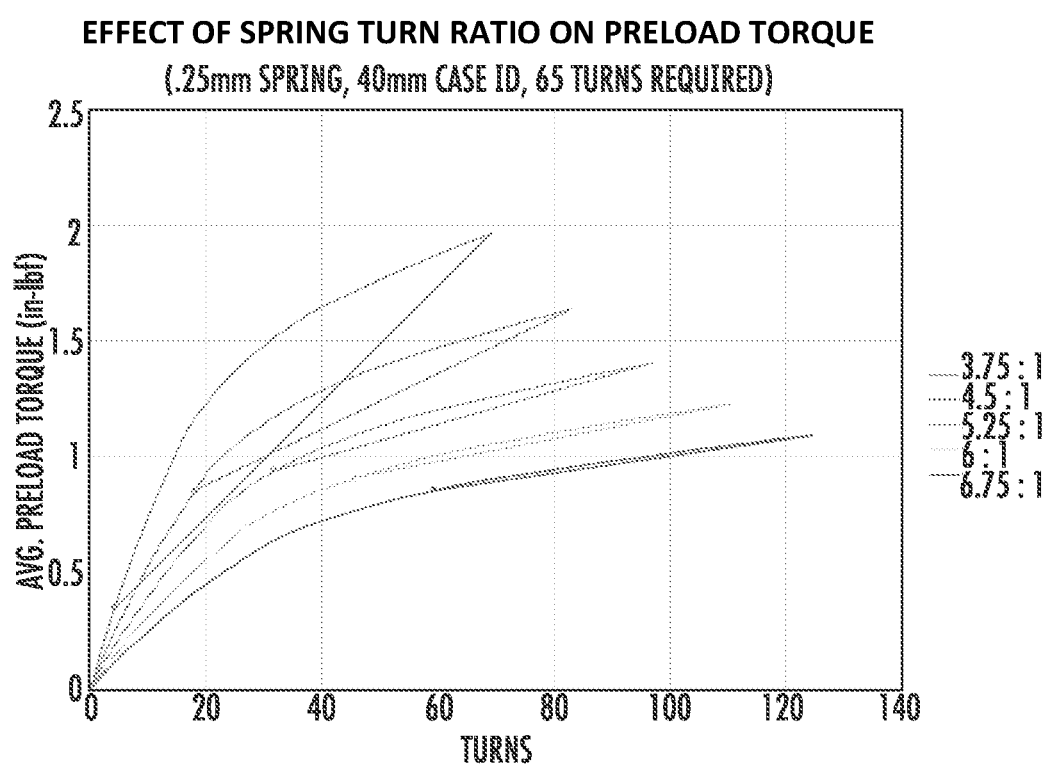
FIG. 4 is a graph showing the effect of the gear ratio of a geared retraction control system on the preload torque of a tape measure spiral spring, according to an exemplary embodiment.

In general as noted above, using a thicker spring increases torque while reducing the number of turns applied to the spring to achieve a particular level of energy stored within the spring. Thus, by utilizing a reduction gear drive, such as gear train 42, a smaller, more compact spring can be used by taking advantage of the increased power density of the lower turn spring. In specific embodiments, spring 26 and gear train 42 are configured to deliver a preload torque of 0.5-2.5 in-lbf, and specifically of 1.0-1.4 in-lbf, and a maximum torque reacting between reel 20 and axle 24 of 3-20 in-lbf, and specifically of 6.0-12.0 in-lbf. Referring to FIG. 4, the effect on preload torque of various gear ratios is shown for an exemplary tape measure and spring having the following characteristics: 0.25 mm spring thickness, 40 mm tape housing inner diameter and 65 initial turns. As shown in FIG. 4, preload torque decreases as gear ratio increases. Given a desired target preload torque of between 1.0-1.4 in-lbf, a gear ratio of between about 4.5:1 to 6:1 is desirable for the given spring and tape housing shown in FIG. 4.

As will be understood, the retraction speed delivered to reel 20 is related to the torque and energy supplied by spring 26 and gear train 42 to reel 20 during retraction. In specific embodiments, spring 26 and gear train 42 are configured to deliver a desired rotation speed to reel 20 during retraction of between 200 rpm to 1500 rpm, specifically of 500 rpm to 900 rpm and more specifically of between 650 rpm to 750 rpm.

Retraction system 40 also includes a fixed, rigid connection 48 coupling gear train 42 to housing 12. As will be generally understood, one component of gear train 42 is coupled to housing 12 via connection 48, which allows for the rotation transfer and gear reduction from input 44 to output 46 of gear train 42. As will be discussed in detail below, which gear train components are coupled to reel 20, to axle 24 and to housing 12 through connection 48 will vary based on the particular gear train design used. However, as noted above, in various embodiments, a rotatable component of gear train 42 is coupled to reel 20 such that rotation of reel 20 is transferred to gear train 42 and a rotatable component of gear train 42 is coupled to axle 24 such that rotation of reel 20 is transferred through gear train 42 to axle 24.

In various embodiments, gear train 42 may be any one of a variety of epicyclic gear train designs. In specific embodiments, gear train 42 is any one of the gear arrangements shown and described in ANSI/AGMA 6123-B06. In other embodiments, gear train 42 includes two or more epicyclic gear arrangements connected to each in series in which the input of a first epicyclic gear arrangement is coupled to reel 20, the output of the first epicyclic gear arrangement is coupled to the input of a second gear arrangement, and the output of the second epicyclic gear arrangement is coupled to axle 24. This pattern can be repeated for gear trains 42 that include, 3, 4, 5, etc. epicyclic gear trains in series. In other embodiments, gear train 42 is a gear arrangement not described in ANSI/AGMA 6123-B06. As will be understood, utilizing some epicyclic gear arrangements in which the input of the gear train is coupled to reel 20, the output is coupled to axle 24 and spring 26 is coupled between reel 20 and axle 24, spring 26 is wound in the same direction as rotation of reel 20 during tape extension, and in other embodiments, spring 26 is wound in the opposite direction of rotation of reel 20 during tape extension.

While Applicant generally understands that a wide variety of epicyclic gear train arrangement may be implemented as gear train 42 discussed above, Applicant believes that certain gear train arrangements provide for efficient space use within tape housing 12, low complexity, desirable torque characteristics, etc. Specific exemplary embodiments of such gear trains are shown in FIGS. 2 and 5-18.

Referring to FIG. 3, in a specific embodiment, gear train 42 may be a planetary gear train 50. Planetary gear train 50 includes a central or sun gear 52, an outer ring gear 54, a gear carrier 56 and at least two planetary gears 58.

As shown in FIG. 3, sun gear 52 is rigidly coupled to tape housing 12 and provides fixed connection 48 between planetary gear train 50 and housing 12. Sun gear 52 defines an axis of rotation of gear train 50 that is co-linear with rotation axis 28 of tape measure 10. In the specific embodiment shown, sun gear 52 is a gear structure that extends inward from an inner surface of tape housing 12. In one embodiment, sun gear 52 is a structure that is integrally formed or molded with a component of housing 12, and in another embodiment, sun gear 52 is a separate piece coupled (e.g., through an adhesive, weld, friction fit, etc.) to the inner surface of housing 12.

Outer ring gear 54 is rigidly coupled to reel 20. As shown in FIG. 3, outer ring gear 54 is formed on an annular flange 60 that extends outward from reel 20. As will be understood (see FIG. 5), outer ring gear 54 includes gear teeth extending radially inward from an inner, generally cylindrical surface of annular flange 60 such that outer ring gear 54 surrounds rotation axis 28. In some embodiments, outer ring gear 54 and reel 20 are integrally formed or molded from a single, contiguous and continuous piece of material, and in another embodiment, outer ring gear 54 is a separate piece coupled (e.g., through an adhesive, weld, friction fit, etc.) to an outer surface of reel 20.

Planetary gears 58 are mounted to posts 62 of gear carrier 56. Gear carrier 56 is rigidly (e.g., non-rotationally) coupled to axle 24. The gear teeth of planetary gears 58 interface with gear teeth of outer ring gear 54 and with the gear teeth of fixed sun gear 52. In this arrangement, as reel 20 rotates during tape extension, the interface between outer ring gear 54 and planetary gears 58 translates rotational motion of reel 20 to planetary gears 58. Through the engagement between planetary gears 58 and sun gear 52, planetary gears "orbit" around sun gear 52 which, in turn translates the orbital movement of planetary gears 58 to gear carrier 56 and to axle 24. In the specific embodiment shown in FIG. 3, planetary gear train 50 results in rotation of axle 24 in the same direction as reel 20, such that spiral structure of spring 26 is coiled in the same direction as tape 18 on reel 20.

As will be understood, the relative sizing of sun gear 52, ring gear 54 and planetary gears 58 dictates the gear reduction between reel 20 and axle 24. Thus, this relative sizing of gear train components dictates the spring turn ratio (see Equation 1 above) for planetary gear train 50.

Referring to FIG. 3, in addition to the increased spring energy density and the resulting space savings within housing 12 provided by the gear reduction of planetary gear train 50, the arrangement of planetary gear train 50 relative to spring 26 and reel 20 shown in FIG. 3 provides further space savings. In particular, in the embodiment of FIG. 3, spring 26 is coupled directly between reel 20 and axle 24, which allows spring 26 to be sized to fill the entire cross-sectional diameter of internal chamber 64 of reel 20. Thus, in such embodiments, the outermost coil of spring 26 faces the inner cylindrical surface of reel 20 without a component of planetary gear train 50 located between spring 26 and reel 20. In addition, compared to some epicyclic gear arrangements, planetary gear train 50 further provides for a relatively low number of moving components. Also, planetary gear train 50 only results in a relatively minor addition to tape measure width as only one layer of gearing is arranged in the width direction between housing 12 and reel 20/axle 25.

Figure 5:
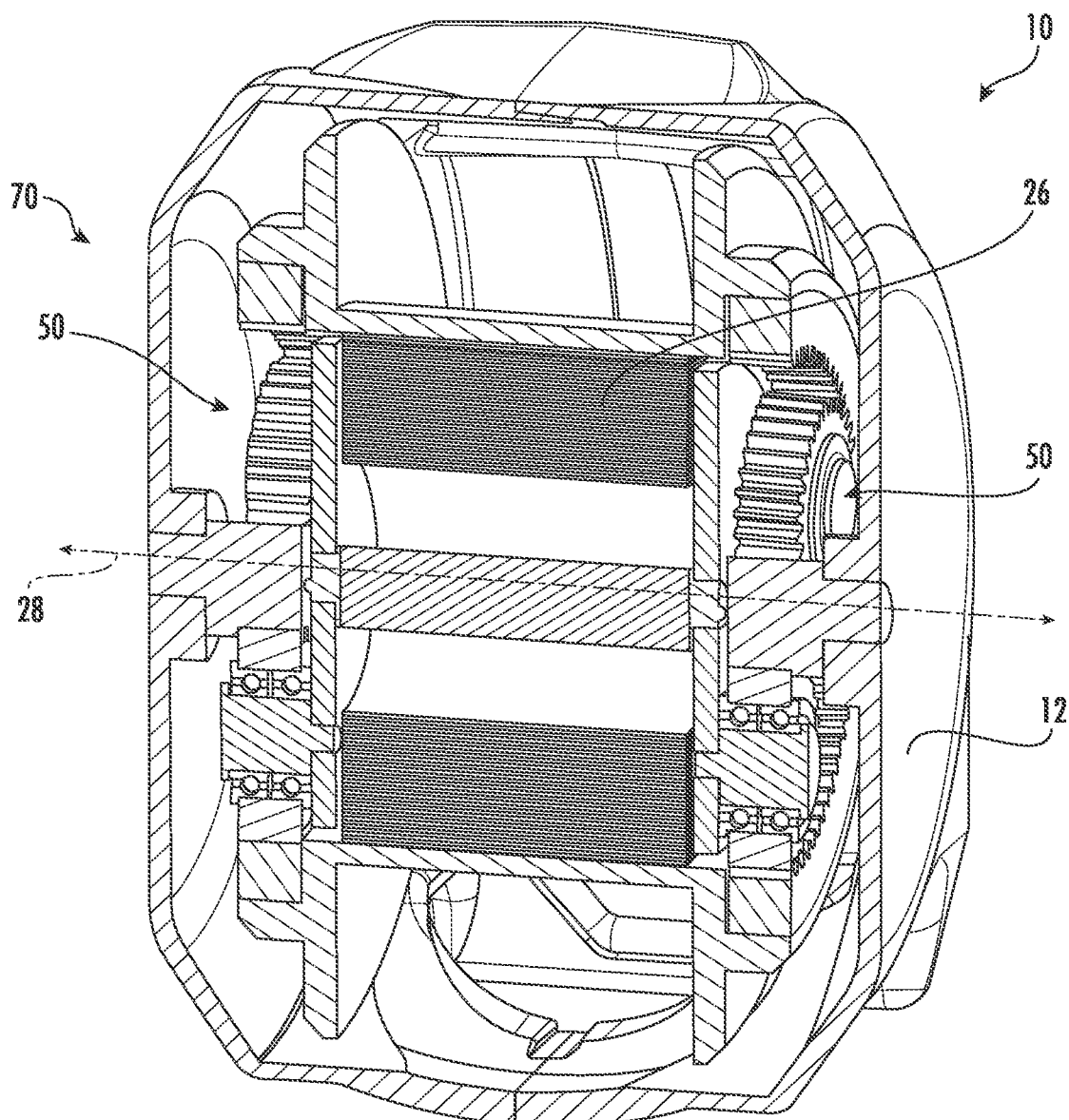
FIG. 5 is a cross-sectional perspective view of a tape measure including a geared retraction control system, according to another exemplary embodiment.

Referring to FIG. 5, tape measure 10 may include a gear train, shown as gear train 70. Gear train 70 is an exemplary embodiment of gear train 42 discussed above regarding FIG. 2. In this embodiment, gear train 70 includes a pair of opposing planetary gear trains 50. In the embodiment shown in FIG. 5, one planetary gear train 50 is located on one side of reel 20 and a second planetary gear train 50 is located on the other side of reel 20. In this arrangement, spring 26 is located within reel 20 and located between the two opposing planetary gear trains 50 along axis of rotation 28.

Figure 6:
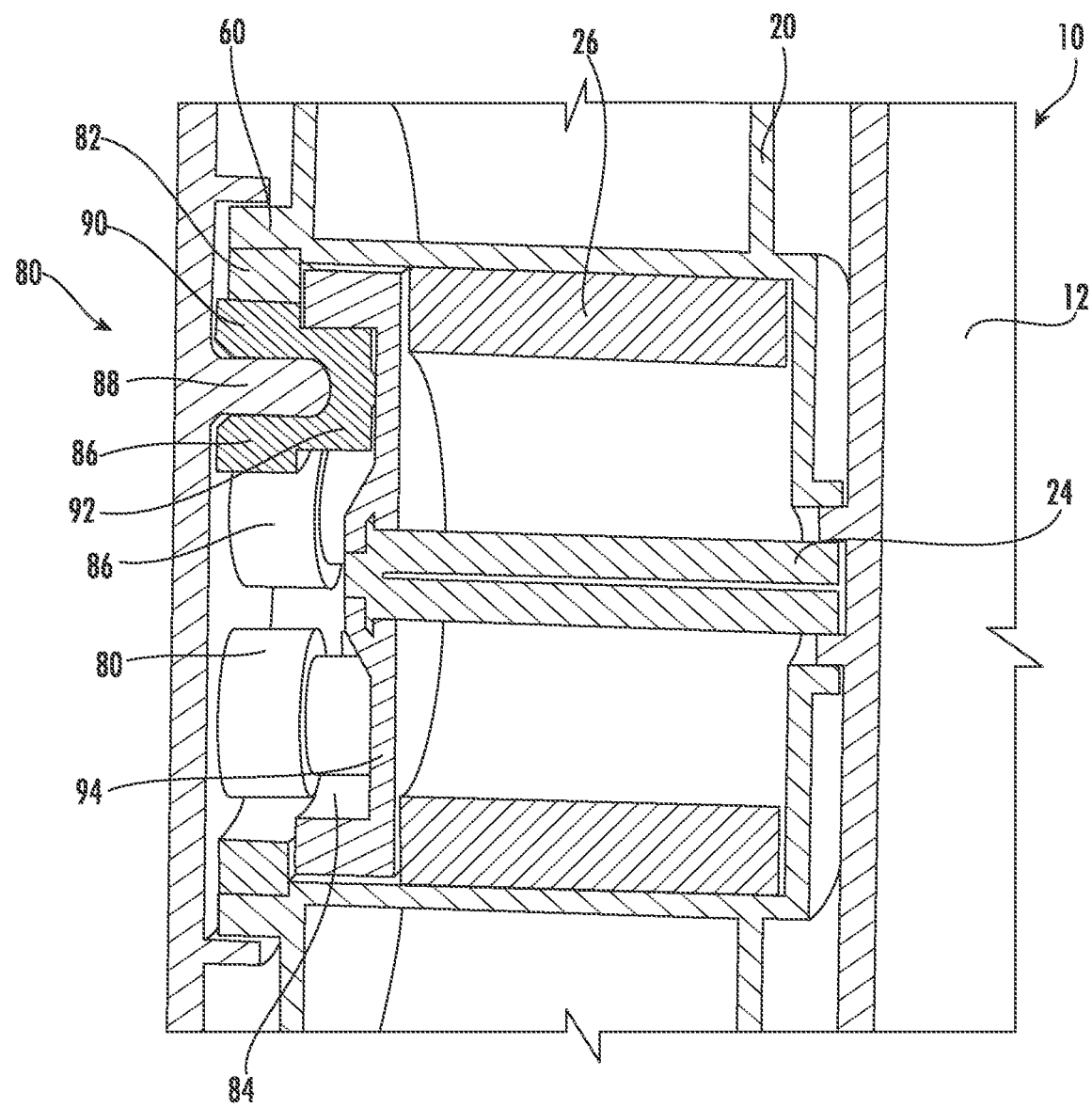
FIG. 6 is a cross-sectional perspective view of a tape measure including a geared retraction control system, according to another exemplary embodiment.
Figure 7:
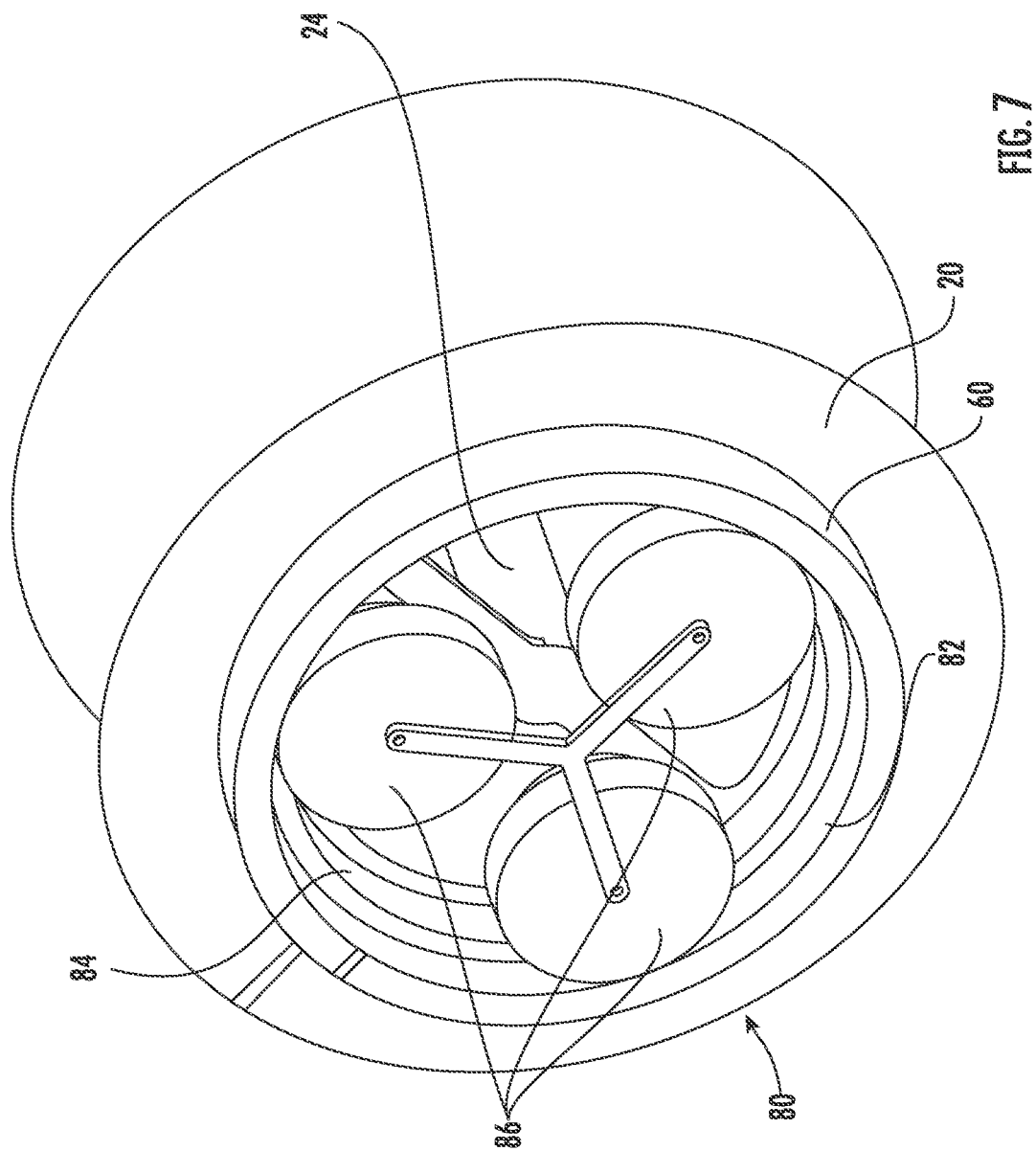
FIG. 7 is a perspective view of the geared retraction control system of FIG. 6, according to an exemplary embodiment.
Figure 8:
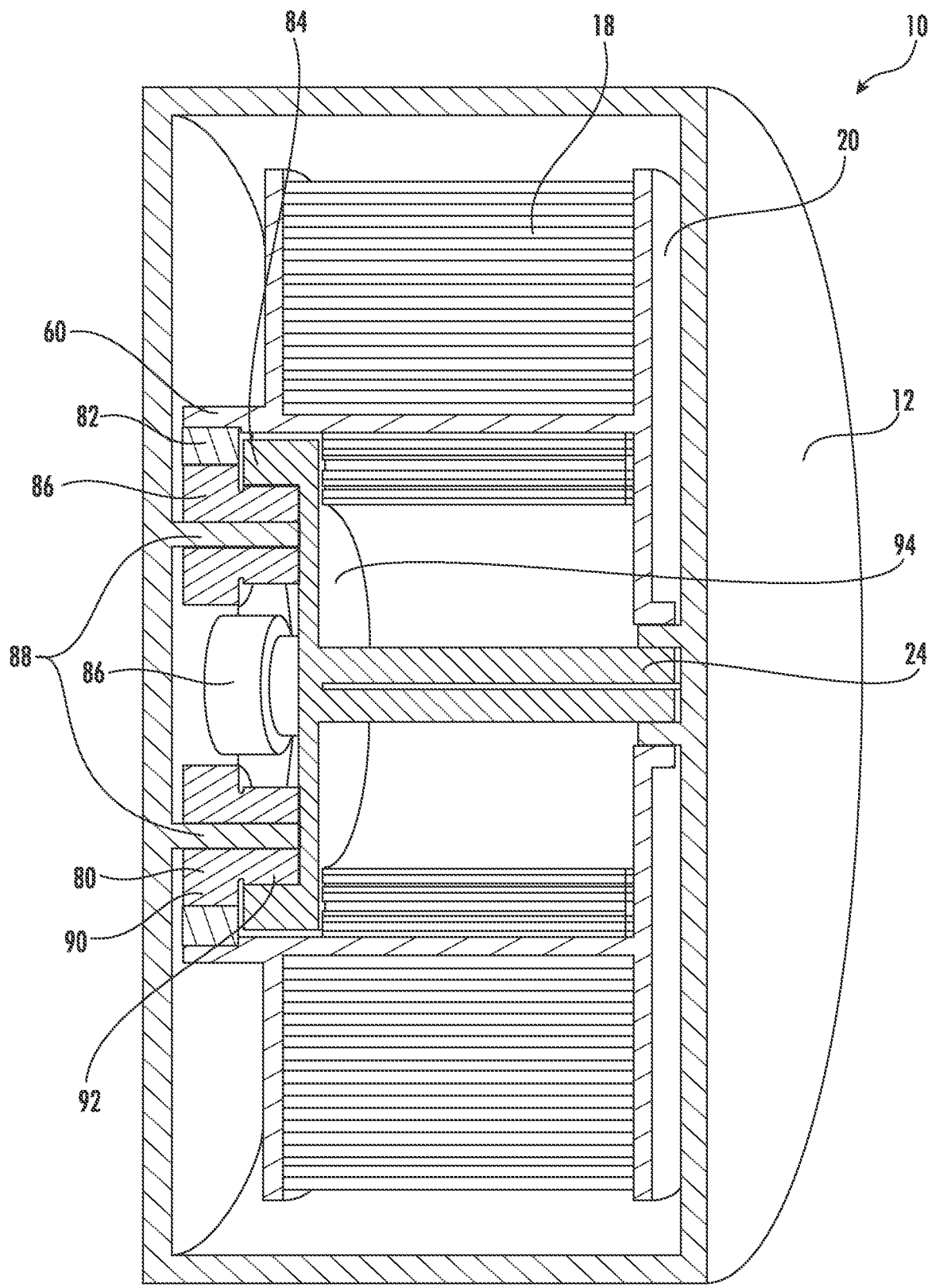
FIG. 8 is a cross-sectional perspective view of the tape measure including the geared retraction control system of FIG. 6, according to an exemplary embodiment.

Referring to FIGS. 6-8, tape measure 10 may include a gear train, shown as gear train 80. Gear train 80 is an exemplary embodiment of gear train 42 discussed above regarding FIG. 2. As shown, gear train 80 is an epicyclic gear train and includes an outer ring gear 82, an inner ring gear 84 and at least two planetary gears 86.

Outer ring gear 82 is rigidly coupled to reel 20. As shown in FIG. 6, outer ring gear 54 is located on annular flange 60 that extends outward from reel 20. As will be understood (see FIG. 5), outer ring gear 82 includes gear teeth extending radially inward from an inner, generally cylindrical surface of annular flange 60. In some embodiments, outer ring gear 82 and reel 20 are integrally formed or molded from a single, contiguous and continuous piece of material, and in another embodiment, outer ring gear 82 is a separate piece coupled (e.g., through an adhesive, weld, friction fit, etc.) to an outer surface of reel 20.

Each planetary gear 86 is rotationally mounted to posts 88 that are rigidly coupled to the inner surface of housing 12. Posts 88 are rigidly coupled to tape housing 12 such that planetary gears 86 are prevented from translating relative to housing 12 but are permitted to spin or rotated about posts 88 to translate rotation to axle 24. In this manner, posts 88 provide the fixed connection (see connection 48 in FIG. 2) between gear train 80 and housing 12.

Each planetary gear 86 includes an outer or high gear section 90 and an inner or low gear section 92. Inner ring gear 84 is rigidly coupled axle 24 through plate 94. In some embodiments, inner ring gear 84 and/or plate 94 are integrally formed or molded from a single, contiguous and continuous piece of material with axle 24, and in another embodiment, inner ring gear 84 and/or plate 94 are separate pieces coupled (e.g., through an adhesive, weld, friction fit, etc.) to axle 24.

In operation during tape extension, outer ring gear 82 engages high gear section 90 of each planetary gear 86 such that rotation of reel 20 translates into rotation of each planetary gear 86 about its post 88. Low gear section 92 of each planetary gear 86 engages inner ring gear 84 such that rotation of the planetary gears 86 translates into rotation of inner ring gear 84. Through the rigid coupling between inner ring gear 84 and axle 24, the rotation of inner ring gear 84 causes rotation of axle 24. In the specific embodiment shown in FIGS. 6-8, gear train 80 results in rotation of axle 24 in the same direction as reel 20, such that spiral structure spring 26 is coiled in the same direction as tape 18 on reel 20.

Figure 9:
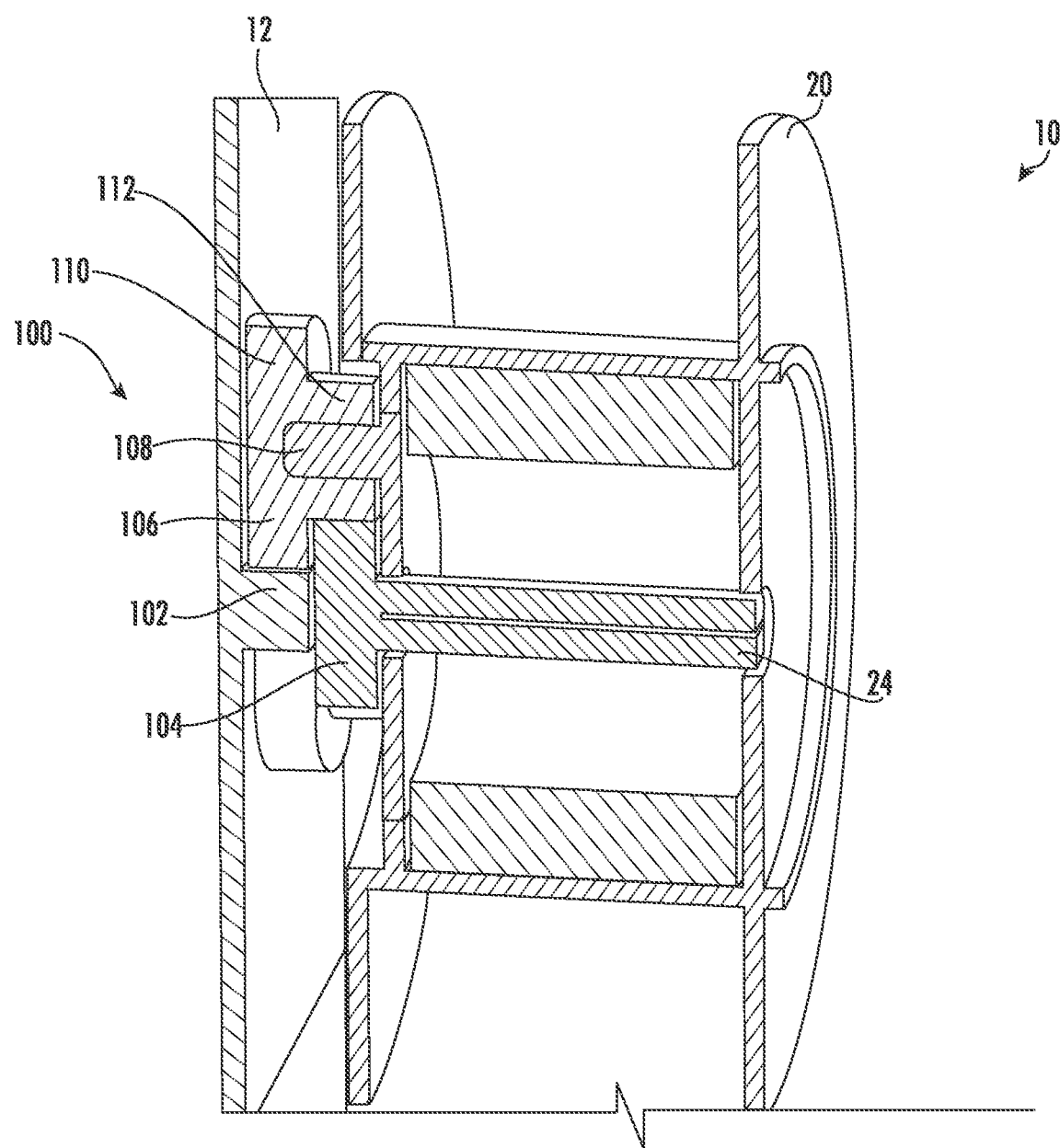
FIG. 9 is a cross-sectional perspective view of a tape measure including a geared retraction control system, according to another exemplary embodiment.

Referring to FIG. 9, tape measure 10 may include a gear train, shown as gear train 100. Gear train 100 is an exemplary embodiment of gear train 42 discussed above regarding FIG. 2. As shown, gear train 100 is an epicyclic gear train and includes a small sun gear 102, a large sun gear 104 and at least two planetary gears 106.

As shown in FIG. 9, small sun gear 102 is rigidly coupled to tape housing 12 and provides fixed connection 48 (see FIG. 2) between gear train 100 and housing 12. In the specific embodiment shown, small sun gear 102 is a gear structure that extends inward from an inner surface of tape housing 12. In one embodiment, small sun gear 102 is a structure that is integrally formed or molded with a component of housing 12, and in another embodiment, sun small gear 102 is a separate piece coupled (e.g., through an adhesive, weld, friction fit, etc.) to the inner surface of housing 12.

As shown in FIG. 9, large sun gear 104 is rigidly coupled to axle 24 and has an outer diameter greater than that of small sun gear 102. In the specific embodiment shown, large gear 104 is a gear structure that extends outward from one of the outer ends of axle 24 in the direction of rotation axis 28. In one embodiment, large sun gear 104 is a structure that is integrally formed or molded with the end of axle 24, and in another embodiment, large sun gear 104 is a separate piece coupled (e.g., through an adhesive, weld, friction fit, etc.) to the end of axle 24.

Gear train 100 includes at least two planetary gears 106 that are mounted to posts 108. Posts 108 extend outward in a direction parallel to rotational axis 28 from outer lateral surfaces of reel 20. In this manner, posts 108 couple planetary gears 106 to reel 20.

Each planetary gear 106 includes an outer or high gear section 110 and an inner or low gear section 112. As shown in FIG. 9, the outer diameter of each high gear section 110 is greater than the outer diameter of low gear section 112. The gear teeth of high gear section 110 engage with small sun gear 102, and the gear teeth of low gear section 112 engage with large sun gear 104.

The coupling between reel 20 and planetary gears 106 through posts 108 carries planetary gears 106 around small sun gear 102 during tape extension. The engagement between low gear section 112 and large sun gear 104 drives rotation of axle 24 as planetary gears 106 rotate or orbit around small sun gear 102. In the specific embodiment shown in FIG. 9, gear train 100 results in rotation of axle 24 in the same direction as reel 20, such that spiral structure spring 26 is coiled in the same direction as tape 18 on reel 20.

Figure 10:
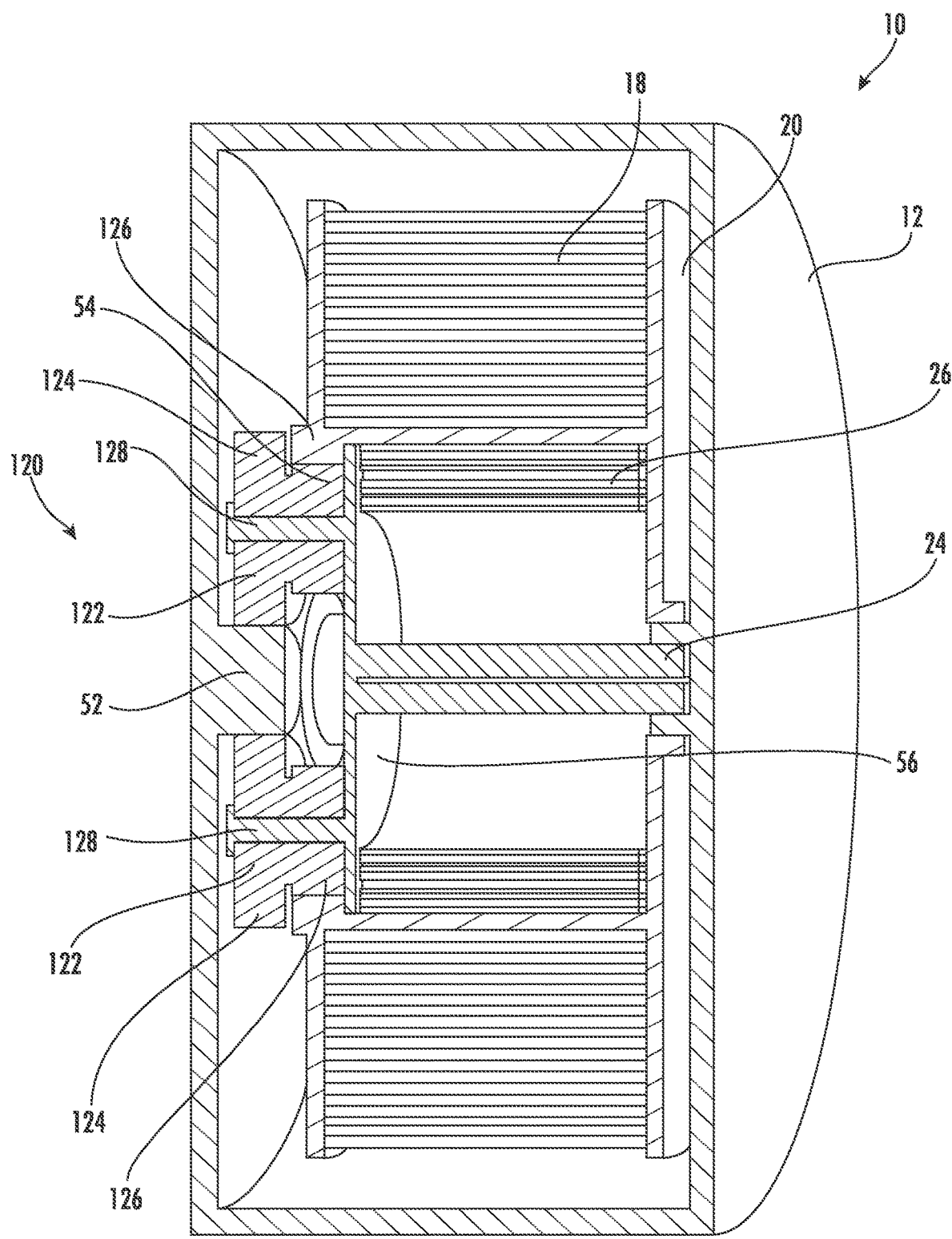
FIG. 10 is a cross-sectional perspective view of a tape measure including a geared retraction control system, according to another exemplary embodiment.

Referring to FIG. 10, tape measure 10 may include a gear train, shown as gear train 120. Gear train 120 is an exemplary embodiment of gear train 42 discussed above regarding FIG. 2. Gear train 120 is similar to gear train 42 shown in FIG. 3 except as discussed herein. As shown, gear train 120 is an epicyclic gear train and includes a central or sun gear 52, an outer ring gear 54, a gear carrier 56 and at least two planetary gears 122.

Each planetary gear 122 includes an outer or high gear section 124 and an inner or low gear section 126. Planetary gears 122 are mounted to posts 128 of gear carrier 56. The gear teeth of low gear section 126 of planetary gears 122 interface with gear teeth of outer ring gear 54. The gear teeth of high gear section 124 of planetary gears 122 interface with the gear teeth of fixed sun gear 52. In this arrangement, as reel 20 rotates during tape extension, the interface between outer ring gear 54 and the gear teeth of low gear section 126 of planetary gears 122 translates rotational motion of reel 20 to planetary gears 122. Through the engagement between planetary gears 122 and sun gear 52, planetary gears 122 "orbit" around sun gear 52, which in turn translates the orbit movement to gear carrier 56 and axle 24. In the specific embodiment shown in FIG. 10, gear train 120 results in rotation of axle 24 in the same direction as reel 20, such that spiral structure spring 26 is coiled in the same direction as tape 18 on reel 20.

FIGS. 11-18 show tape measure 10 including various epicyclic gear train arrangements according to additional exemplary embodiments. In general the gear train arrangements shown in FIGS. 11-18 are similar to those discussed above, in that they provide gear reduction between the reel and the axle such that the number of turns applied to the spring per reel revolution is decreased.

Figure 11:
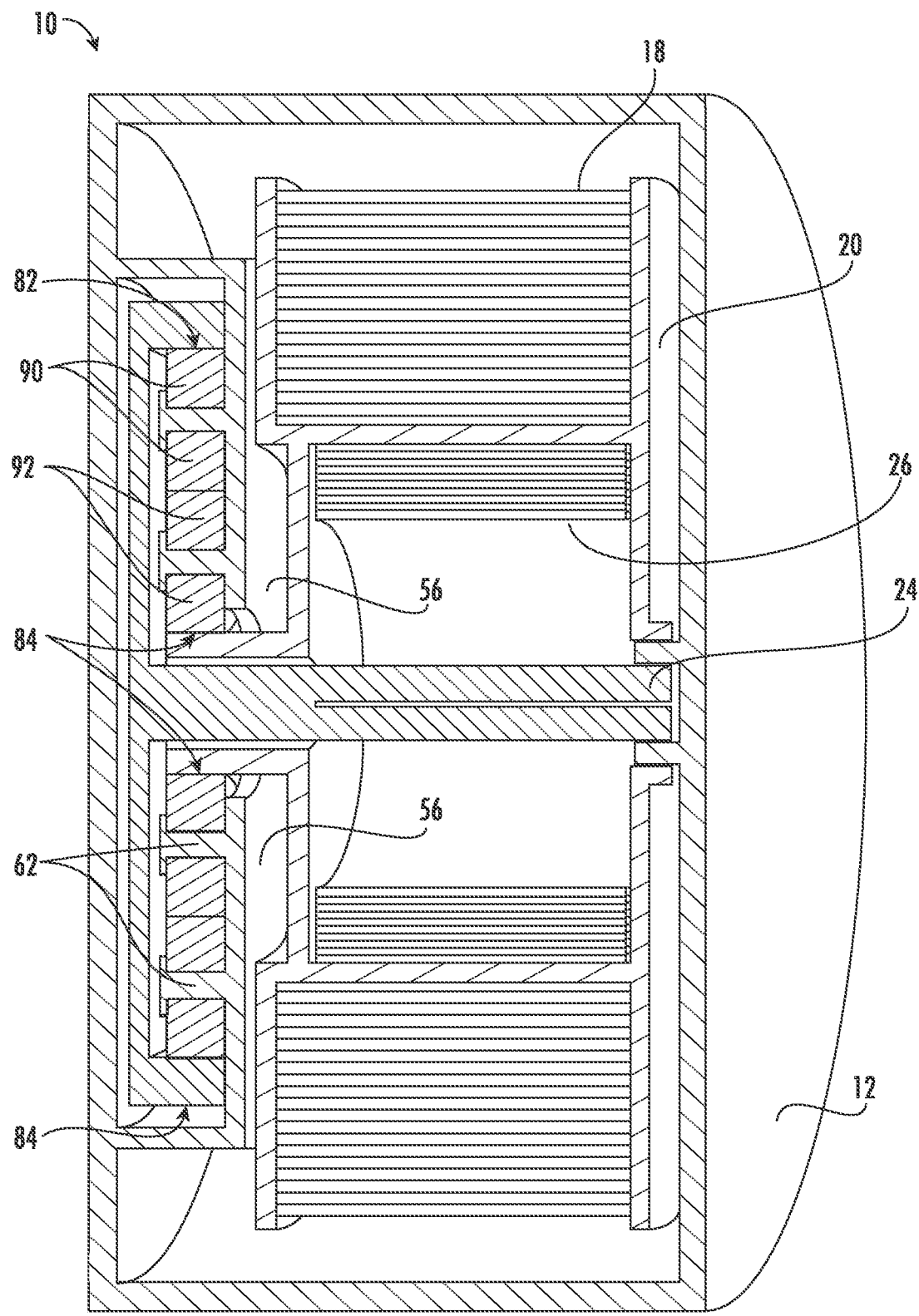
FIG. 11 is a cross-sectional perspective view of a tape measure including a geared retraction control system, according to another exemplary embodiment.

Referring to FIG. 11, gear carrier 56 is coupled to housing 12 and includes posts 62, around which inner planetary gear 92 and outer planetary gear 90 are rotatably mounted. The gear teeth of outer planetary gear 90 interface with outer ring gear 82 and inner planetary gear 92, the gear teeth of which also interface with inner ring gear 84. Outer ring gear 82 is coupled to axle 24, inner ring gear 84 is coupled tape reel 20, and spring 26 is coupled between tape reel 20 and axle 24.

Figure 12:
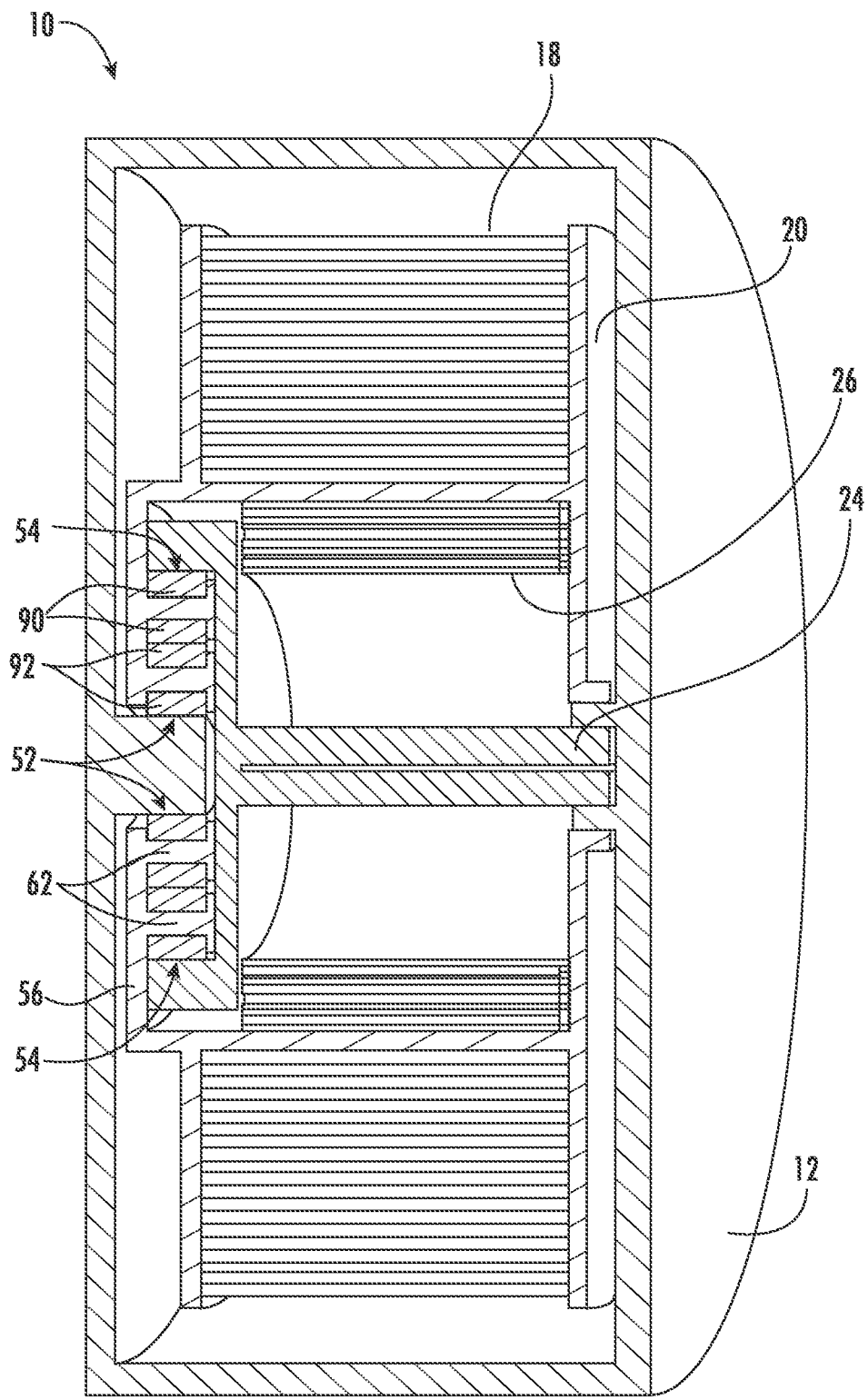
FIG. 12 is a cross-sectional perspective view of a tape measure including a geared retraction control system, according to another exemplary embodiment.

Referring to FIG. 12, gear carrier 56 is coupled to tape reel 20 and includes posts 62, around which inner planetary gear 92 and outer planetary gear 90 are rotatably mounted. The gear teeth of outer planetary gear 90 interface with outer ring gear 54 and inner planetary gear 92, the gear teeth of which also interface with sun gear 52. Sun gear 52 is coupled to housing 12, outer ring gear 54 is coupled to axle 24, and spring 26 is coupled between tape reel 20 and axle 24.

Figure 13:
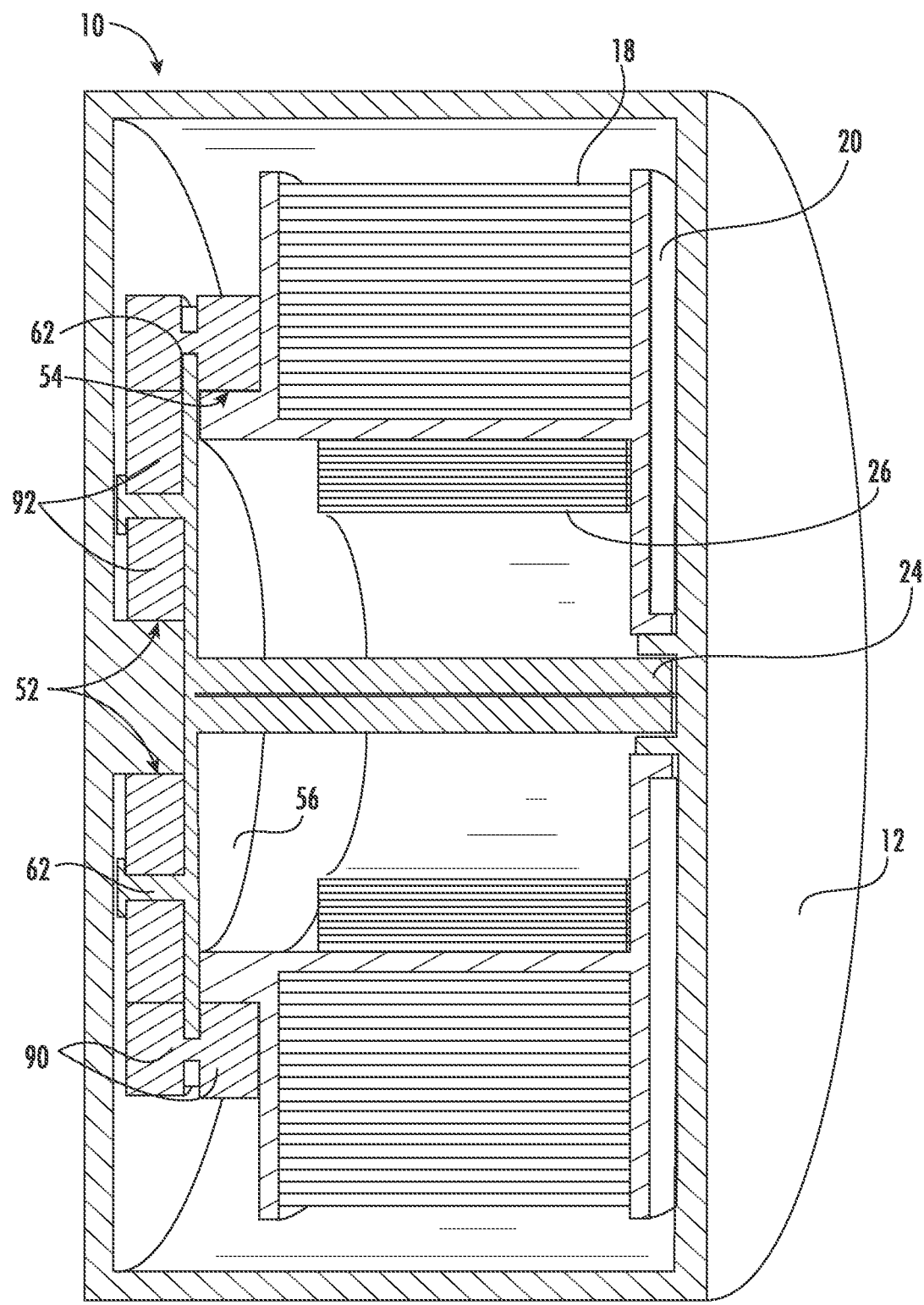
FIG. 13 is a cross-sectional perspective view of a tape measure including a geared retraction control system, according to another exemplary embodiment.

Referring to FIG. 13, gear carrier 56 is coupled to axle 24 and includes posts 62, around which inner planetary gear 92 and outer planetary gear 90 are rotatably mounted. The gear teeth of outer planetary gear 90 interface with outer ring gear 54 and inner planetary gear 92, the gear teeth of which also interface with sun gear 52. Outer ring gear 54 is coupled to tape reel 20, sun gear 52 is coupled to housing 12, and spring 26 is coupled between tape reel 20 and axle 24.

Figure 14:
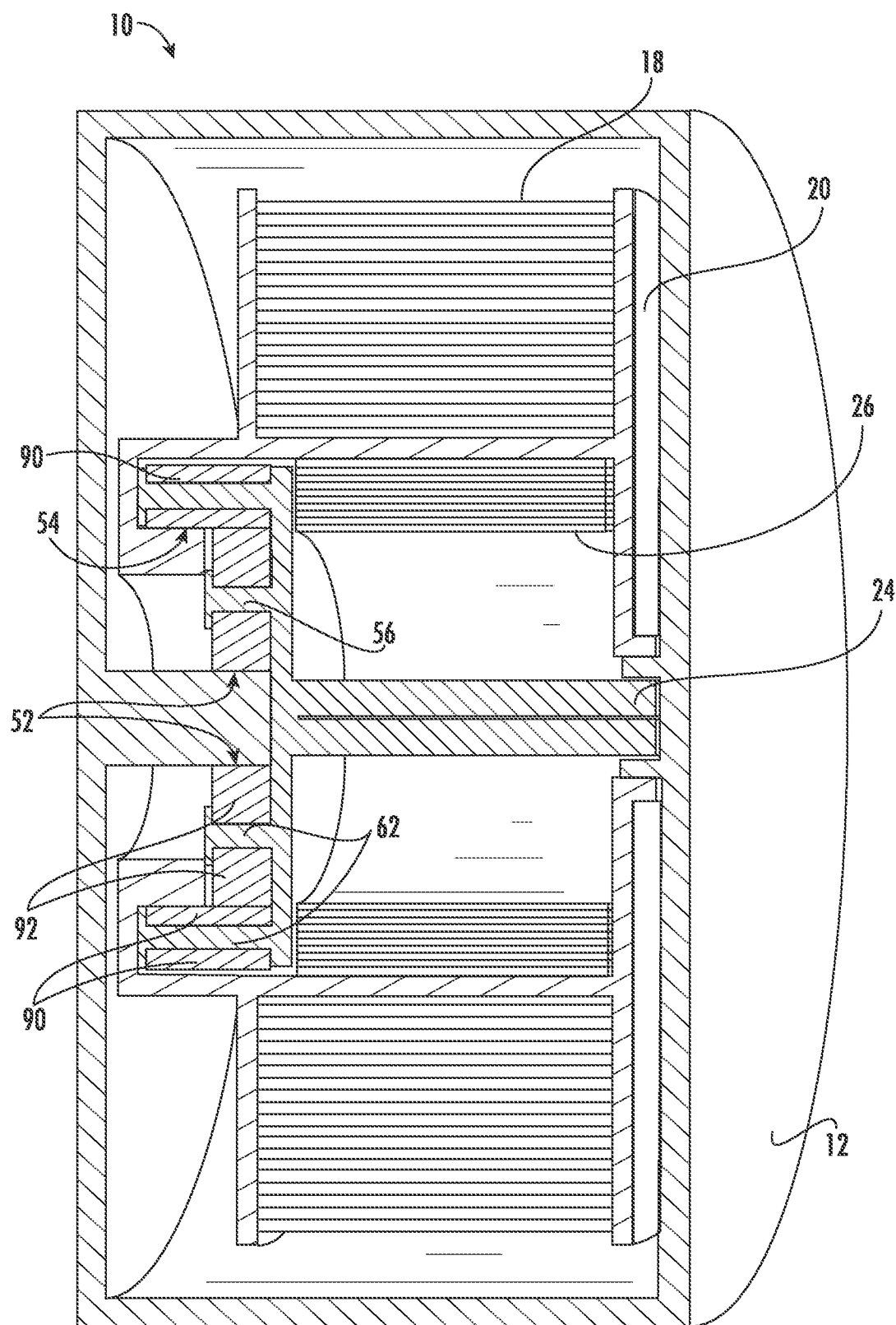
FIG. 14 is a cross-sectional perspective view of a tape measure including a geared retraction control system, according to another exemplary embodiment.

Referring to FIG. 14, gear carrier 56 is coupled to axle 24 and includes posts 62, around which inner planetary gear 92 and outer planetary gear 90 are rotatably mounted. The gear teeth of outer planetary gear 90 interface with outer ring gear 54 and inner planetary gear 92, the gear teeth of which also interface with sun gear 52. Outer ring gear 54 is coupled to tape reel 20, sun gear 52 is coupled to housing 12, and spring 26 is coupled between tape reel 20 and axle 24.

Figure 15:
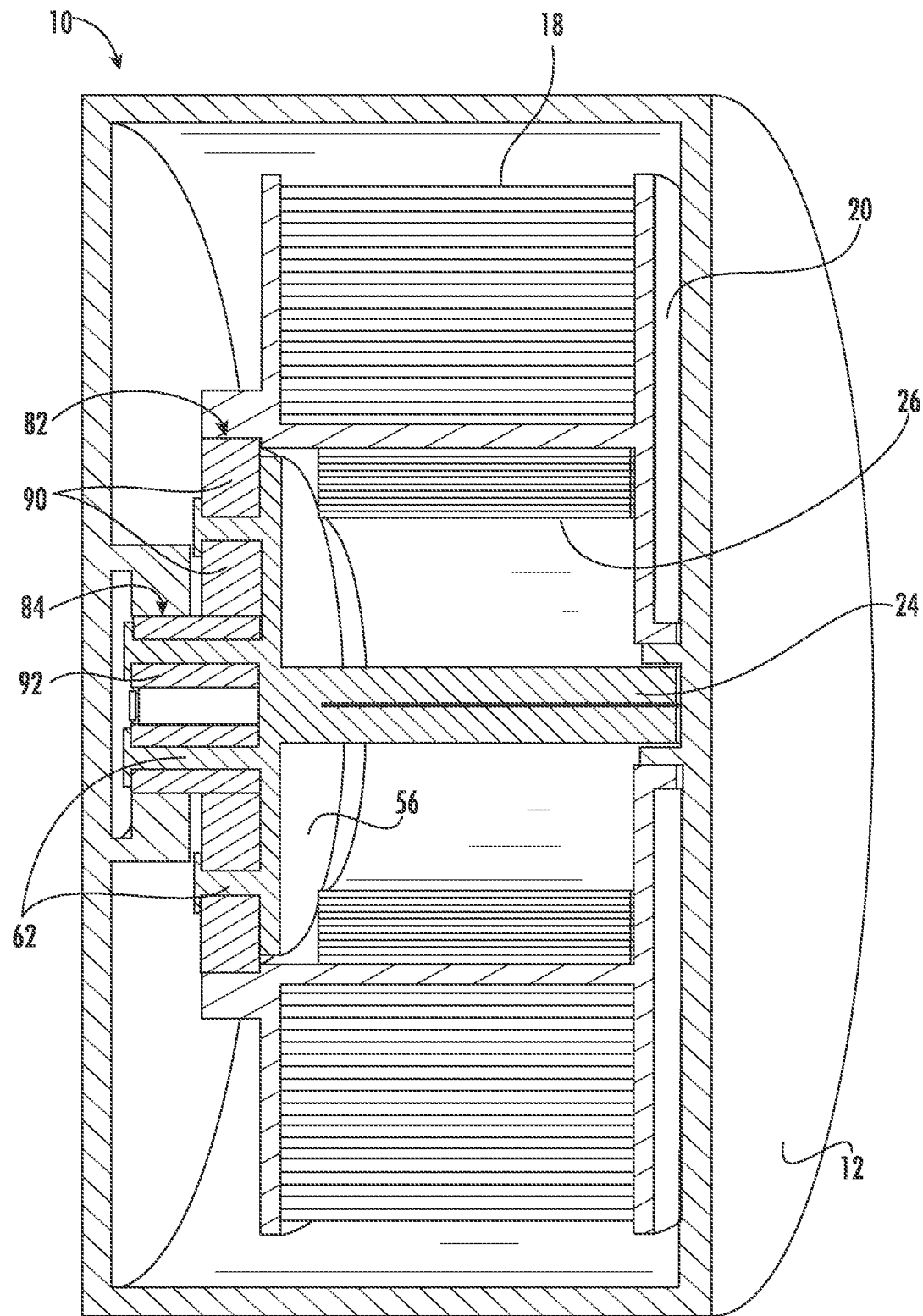
FIG. 15 is a cross-sectional perspective view of a tape measure including a geared retraction control system, according to another exemplary embodiment.

Referring to FIG. 15, gear carrier 56 is coupled to axle 24 and includes posts 62, around which inner planetary gear 92 and outer planetary gear 90 are rotatably mounted. The gear teeth of outer planetary gear 90 interface with outer ring gear 82 and inner planetary gear 92, the gear teeth of which also interface with inner ring gear 84. Outer ring gear 82 is coupled to tape reel 20, inner ring gear 84 is coupled to housing 12, and spring 26 is coupled between tape reel 20 and axle 24.

Figure 16:
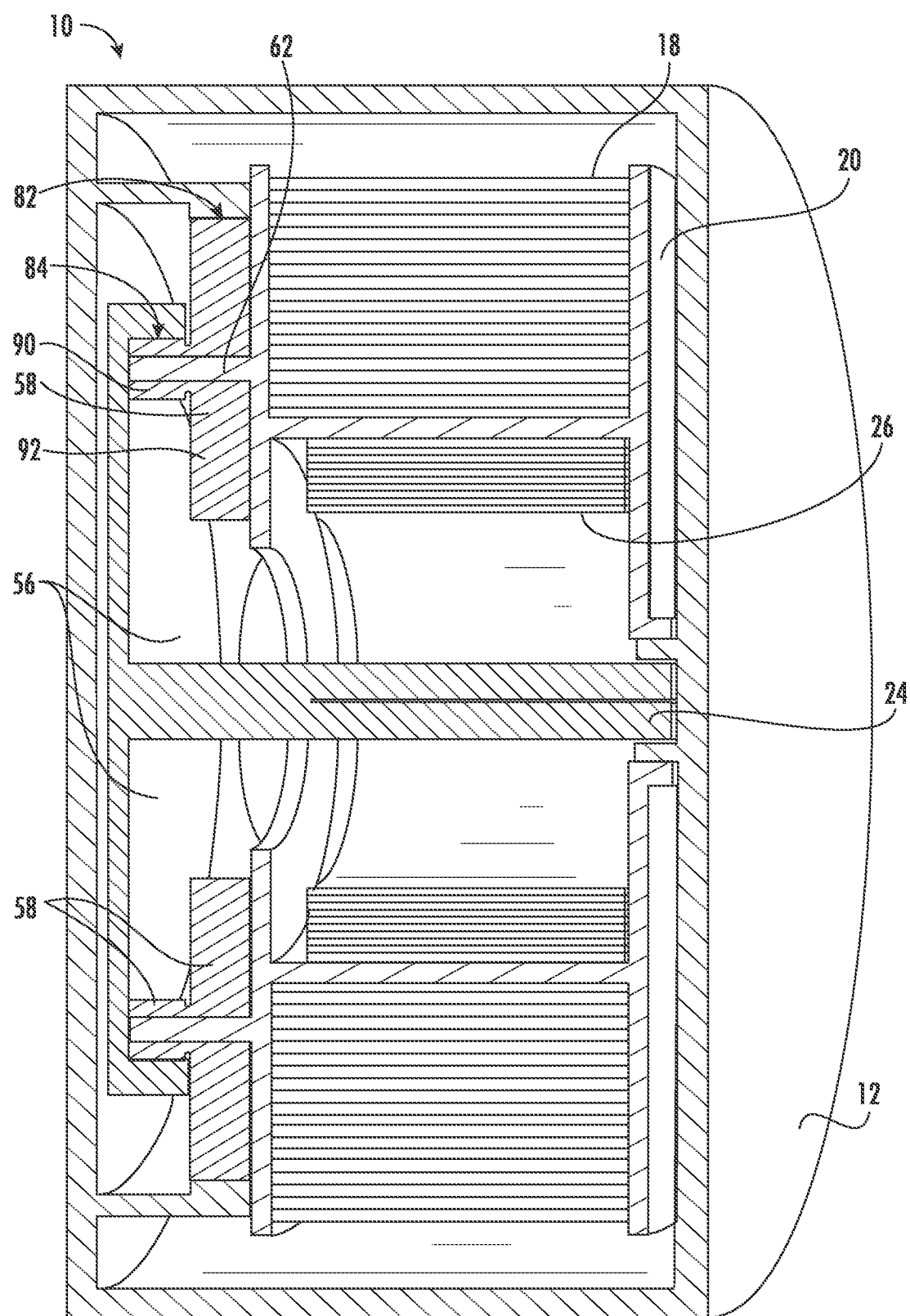
FIG. 16 is a cross-sectional perspective view of a tape measure including a geared retraction control system, according to another exemplary embodiment.

Referring to FIG. 16, gear carrier 56 is coupled to axle 24. Tape reel 20 includes posts 62, around planetary gear 58 is rotatably mounted. The gear teeth of inner planetary gear 92 interface with outer ring gear 82, and the gear teeth of outer planetary gear 90 interface with inner ring gear 84. Outer gear ring 82 is coupled to housing 12, inner gear ring 84 is coupled to gear carrier 56, and spring 26 is coupled between tape reel 20 and axle 24.

Figure 17:
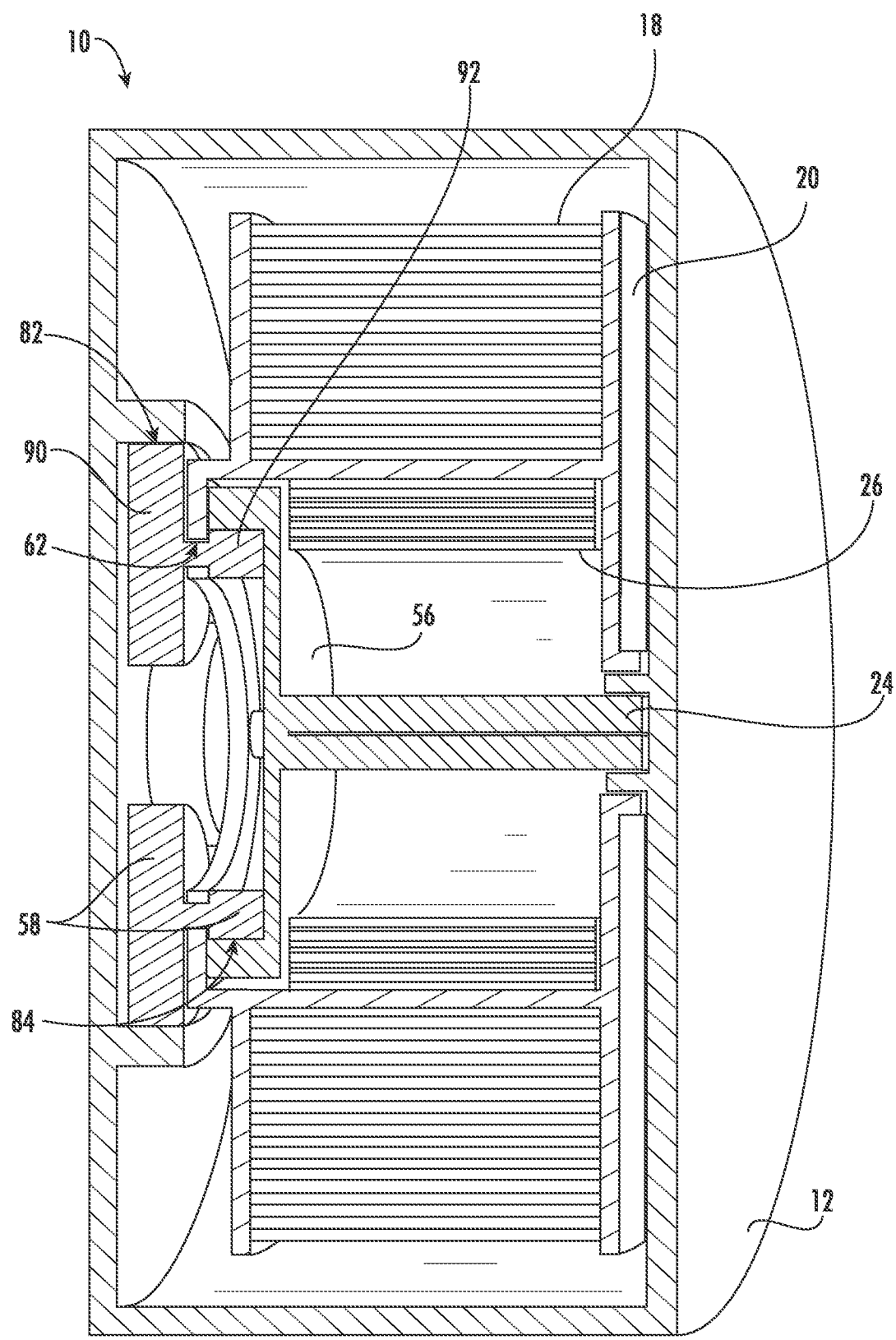
FIG. 17 is a cross-sectional perspective view of a tape measure including a geared retraction control system, according to another exemplary embodiment.

Referring to FIG. 17, gear carrier 56 is coupled to axle 24. Posts 62 are coupled to tape reel 20, and planetary gears 58 are rotatably mounted to posts 62. The gear teeth of outer planetary gear 90 interface with outer ring gear 82, and the gear teeth of inner planetary gear 92 interface with inner ring gear 84. Outer gear ring 82 is coupled to housing 12, inner gear ring 84 is coupled to gear carrier 56, and spring 26 is coupled between tape reel 20 and axle 24.

Figure 18:
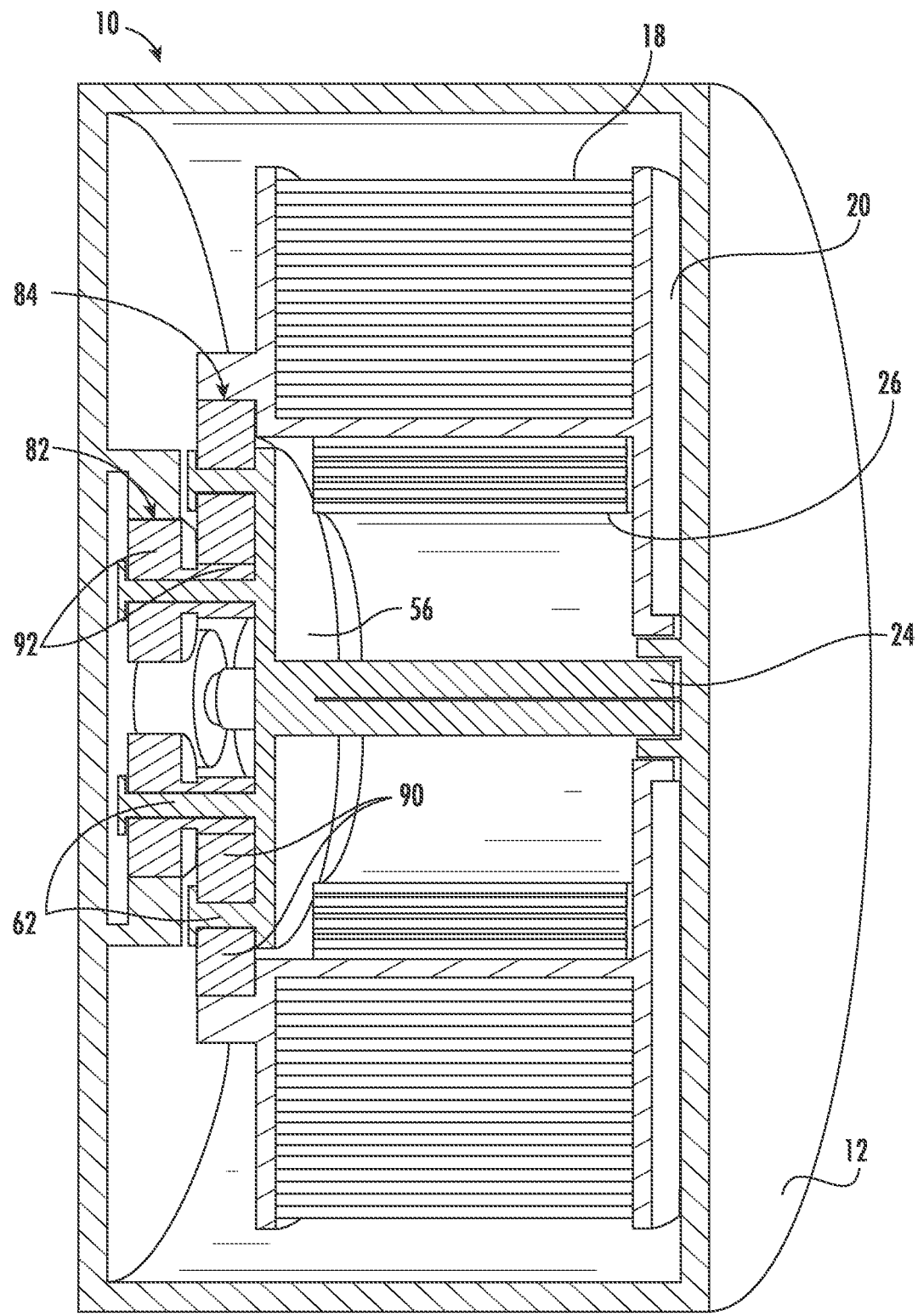
FIG. 18 is a cross-sectional perspective view of a tape measure including a geared retraction control system, according to another exemplary embodiment.

Referring to FIG. 18, gear carrier 56 is coupled to axle 24 and includes posts 62, around which inner planetary gear 92 and outer planetary gear 90 are rotatably mounted. The gear teeth of outer planetary gear 90 interface with inner ring gear 84 and inner planetary gear 92, the gear teeth of which also interface with outer ring gear 82. Inner gear ring 84 is coupled to tape reel 20, outer ring gear 82 is coupled to housing 12, and spring 26 is coupled between tape reel 20 and axle 24.

Figure 19:
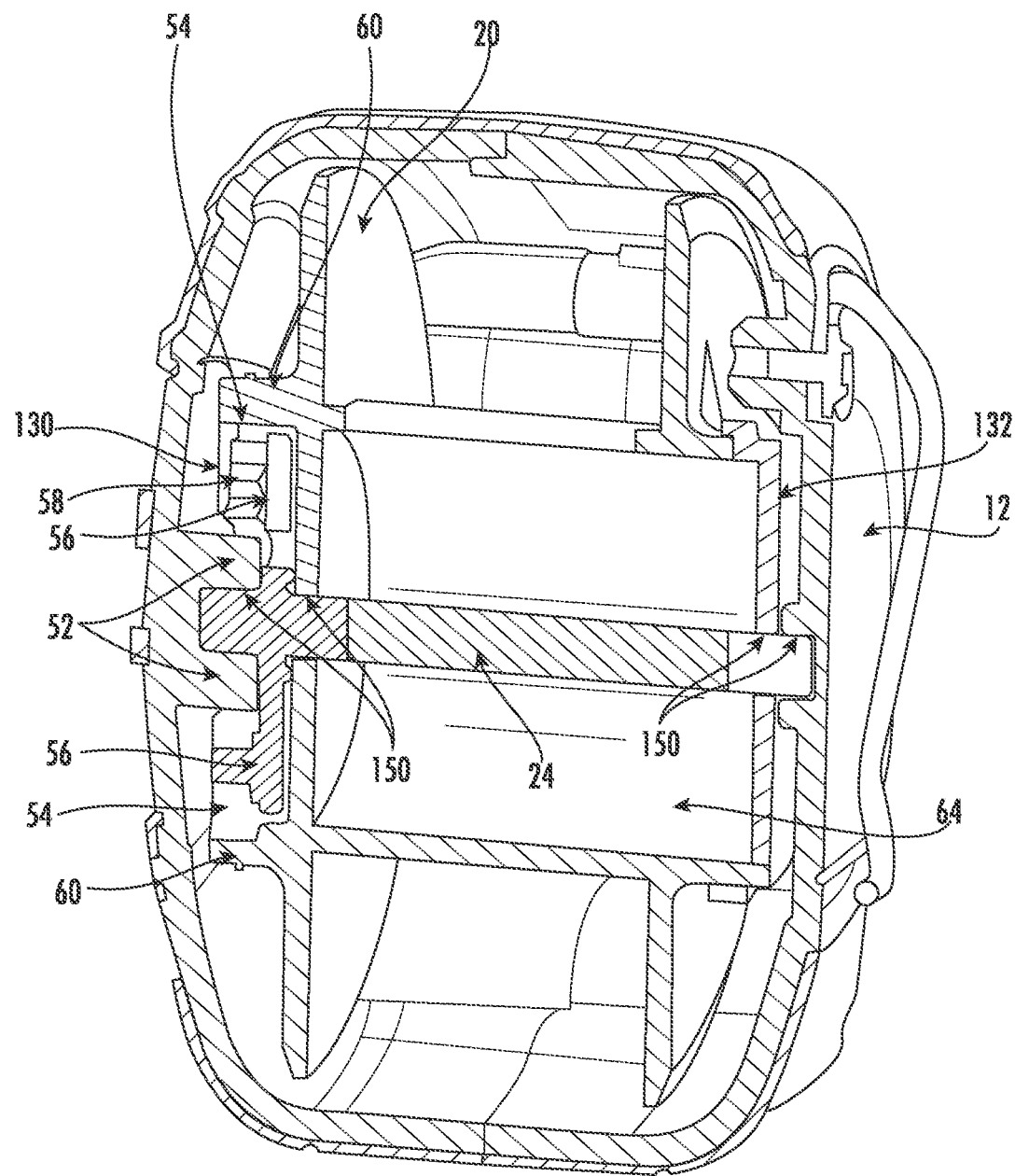
FIG. 19 is a cross-sectional perspective view of a tape measure including a geared retraction control system, according to another exemplary embodiment.

Referring now to FIG. 19, in various embodiments, tape measure 10 may include one or more structures configured to reduce friction while tape reel or spool 20 is rotating (e.g., while housing 12 is paying out or retrieving tape blade 18). On the left side of spool 20 in FIG. 19, spool 20 is supported radially by axle or carrier 24 at contact surface 150. On the right side of spool 20 in FIG. 19, spool 20 is indirectly supported radially by carrier 24 via spool cover 132 at contact surface 150. On both sides of carrier 24, carrier 24 itself is confined by housing 12 at contact surface 150.

In one embodiment, carrier 24 has a diameter of 5 mm and is created from diecast Zinc, although it is contemplated herein that other diameters, manufacturing methods and/or materials may be utilized and still practice the disclosure herein.

Contact surfaces 150, which include the bearing interfacing surfaces of spool 20 and spool cover 132, are located directly around carrier 24. The area of contact surfaces 150 is reduced because the diameter of the bearing surface is smaller relative to other embodiments in which the bearing surface is located at an increased diameter from carrier 24. As a result, the amount of energy lost to friction while spool 20 rotates is concurrently reduced. Therefore less torque is required to provide full retraction of spool 20 and of the tape blade.

Figure 20:
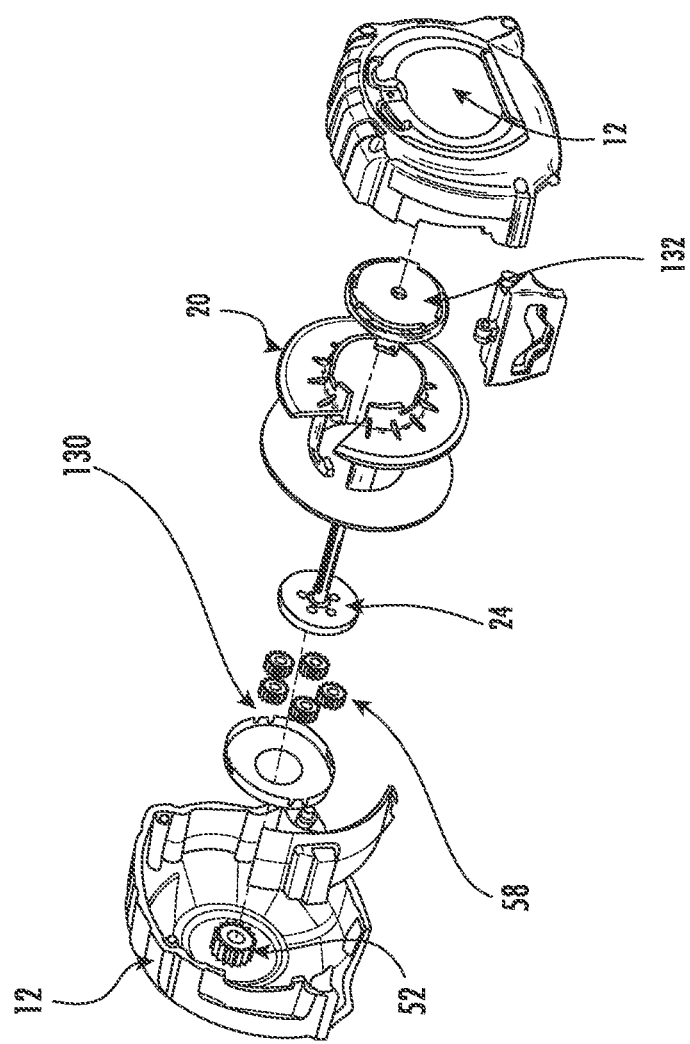
FIG. 20 is an exploded perspective view of the tape measure of FIG. 19, according to an exemplary embodiment.

Tape measure 10 includes dust cover 130, which at least partially encloses the interface between planetary gears 58 and both sun gear 52 and outer ring gear 54 (best shown in FIG. 20).

In the embodiment in FIG. 19, similar to one or more other embodiments described herein, spring 26 is anchored to carrier 24 and spool 20, and planetary gears 58 interface with and rotate around sun gear 52 (best shown in FIG. 20). The outer periphery of planetary gears 58 also interface with outer ring gear 54. Both spool 20 (also referred to as tape reel 20) and carrier 24 (also referred to as axle 24) rotate about the longitudinal axis of axle 24 relative to and within housing 12.

Figure 21:
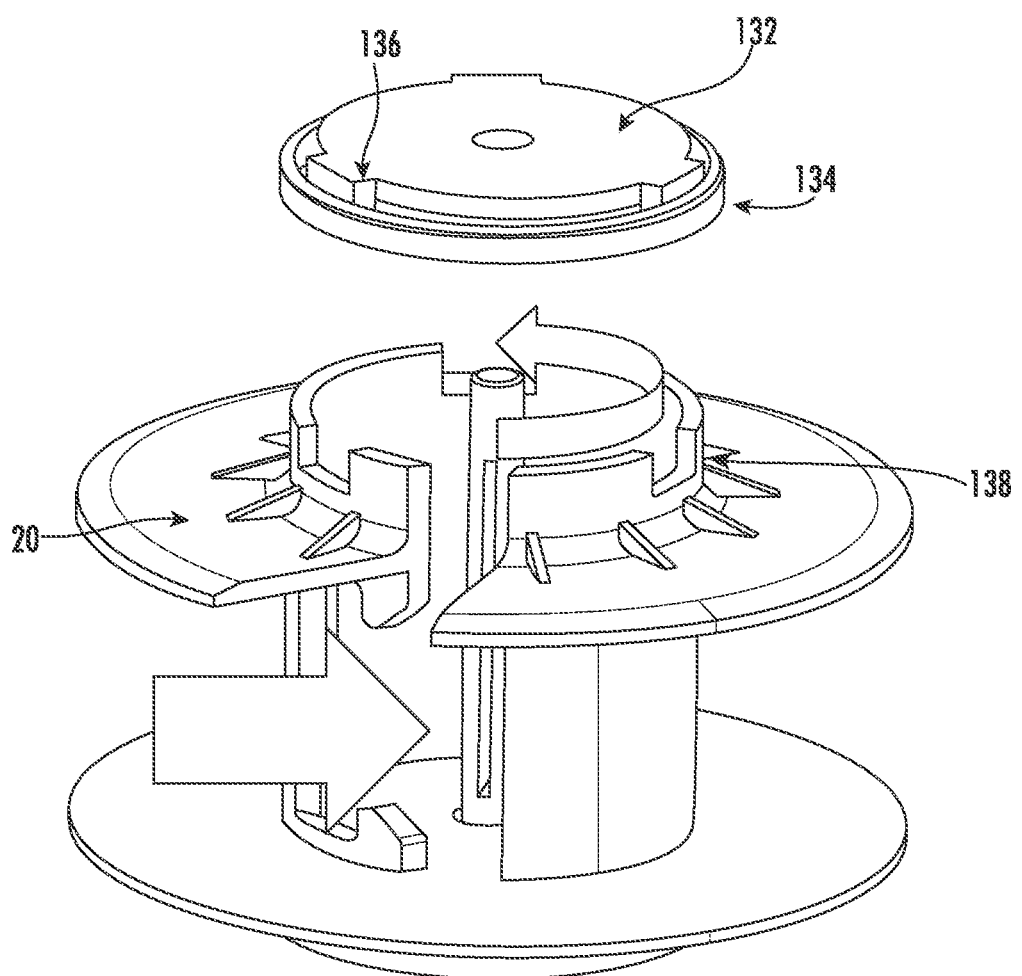
FIG. 21 is a perspective view of the tape spool and spool cover tape measure of FIG. 19, according to an exemplary embodiment.

Referring now to FIG. 21, tape measure 10 also may include spool cover 132, which is located on the opposite side of spool 20 relative to dust cover 130. Spool cover 132 at least partially encloses internal chamber 64 of spool 20 where spring 26 is disposed. Spool cover 132 is rotatably fixed to spool 20 and rotates about carrier 24. The tabs in spool cover 132 allow for easy rotational locking with spool 20 during assembly. Support ring 134 furthers a more secure coupling between spool cover 132 and spool 20, thus reducing a chance of decoupling if tape measure 10 is dropped. In an alternative embodiment spool cover 132 is not fixed to spool 20, and instead is permitted to rotate independently with respect to both carrier 24 and spool 20.

Figure 22:
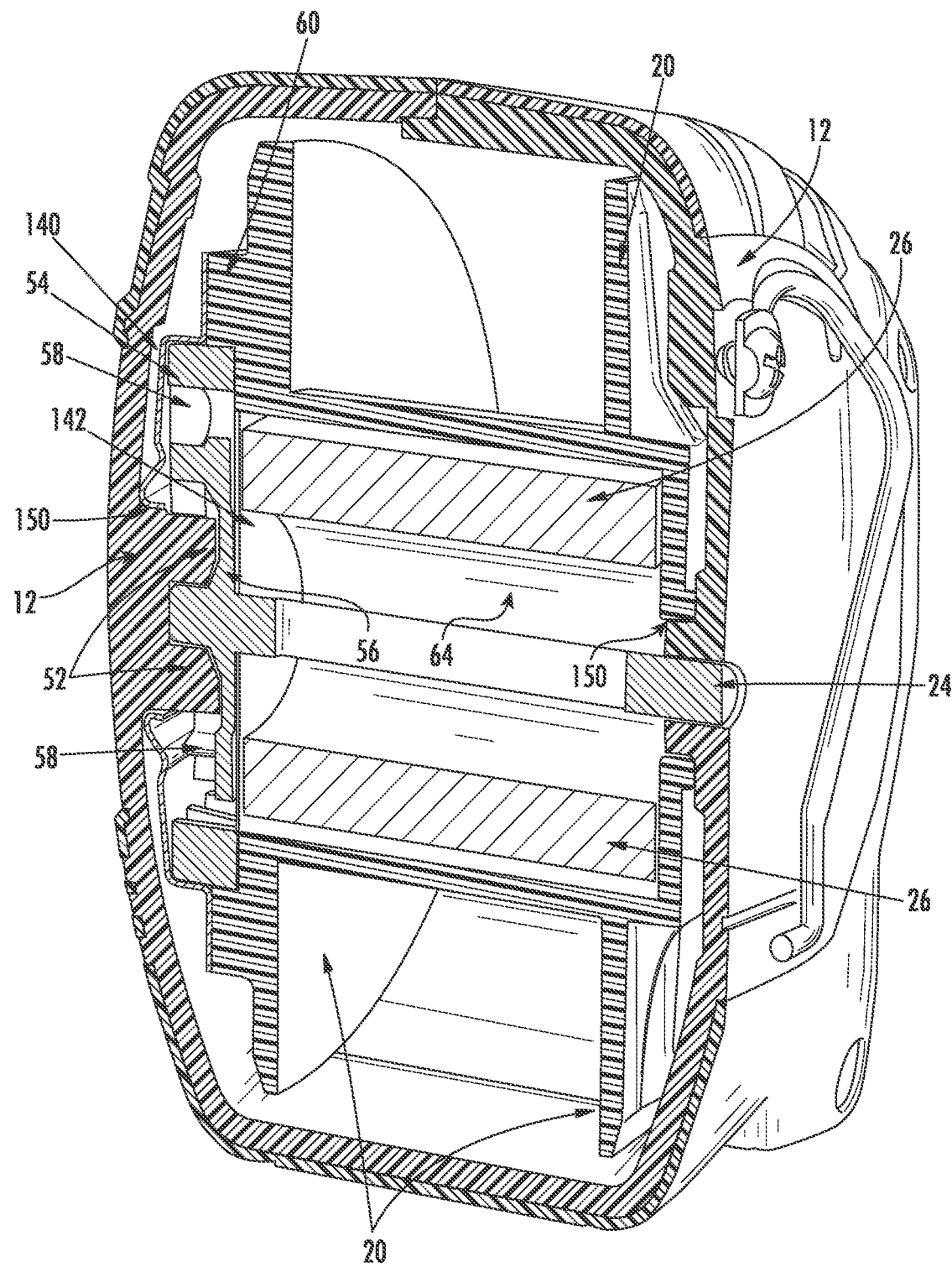
FIG. 22 is a cross-sectional perspective view of a tape measure including a geared retraction control system, according to another exemplary embodiment.

Referring now to FIG. 22, illustrated therein is another embodiment of tape measure 10. In this embodiment, tape measure 10 is designed to create a direct load path between the primary mass of tape measure 10 (typically tape blade 18 and spring 26) into housing 12 which improves durability and stability, for example during impact if tape measure 10 is dropped. Another aspect and advantage of this embodiment is that input torque is converted to higher turns at a lower torque, which is reacted at sun gear 52/front housing 12, causing tape reel 20 to rotate.

In the embodiment shown in FIG. 22, spring 26 is anchored to carrier 24 and spool 20. Carrier 24 spins freely with respect to housing 12 and spool 20. Further, when tape blade 18 is being either paid out or retrieved into housing 12, carrier 24 spins in the same direction as spool 20, but at a slightly slower speed than spool 20.

In this embodiment, spool 20 is radially supported by housing 12 on the right side of FIG. 22 at contact surface 150, and by hubcap 140 on the left side of FIG. 22 at contact surface 150. Contact surfaces 150, which include the bearing interfacing surfaces of spool 20 and hubcap 140, are located around housing 12 as indicated in FIG. 22. Therefore, the area of contact surfaces 150 is slightly increased relative to FIG. 19 because the diameters of the bearing surfaces in FIG. 22 are relatively larger.

Hubcap 140 partially encloses the interface between planetary gears 58 and outer ring gear 54. Hubcap 140 is rotatably fixed to spool 20 (e.g., via rivets, screws, and/or fasteners). In the embodiment illustrated in FIG. 22, hubcap 140 extends from annular flange 60 to approximate a radially interior edge of planetary gears 58. In this configuration hubcap 140 helps prevent contamination from entering the gear assembly. However, it is contemplated herein that hubcap 140 may have other configurations.

Figure 23:
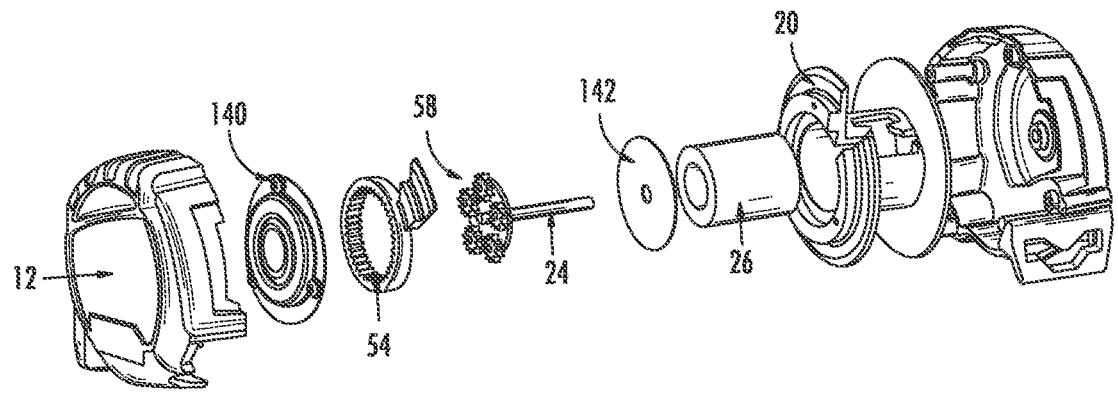
FIG. 23 is an exploded perspective view of the tape measure of FIG. 22, according to an exemplary embodiment.

Also included in the embodiment in FIG. 22 is membrane 142. Membrane 142 separates internal chamber 64 from the gears, including sun gear 52, planetary gears 58, and outer ring gear 54 (best shown in FIGS. 22 and 23). In one embodiment, outer ring gear 54 is configured to be disposed within an opening in spool 20 (best shown in FIG. 23), such that outer ring gear 54 and spool 20 are rotatably fixed together.

Figure 24:
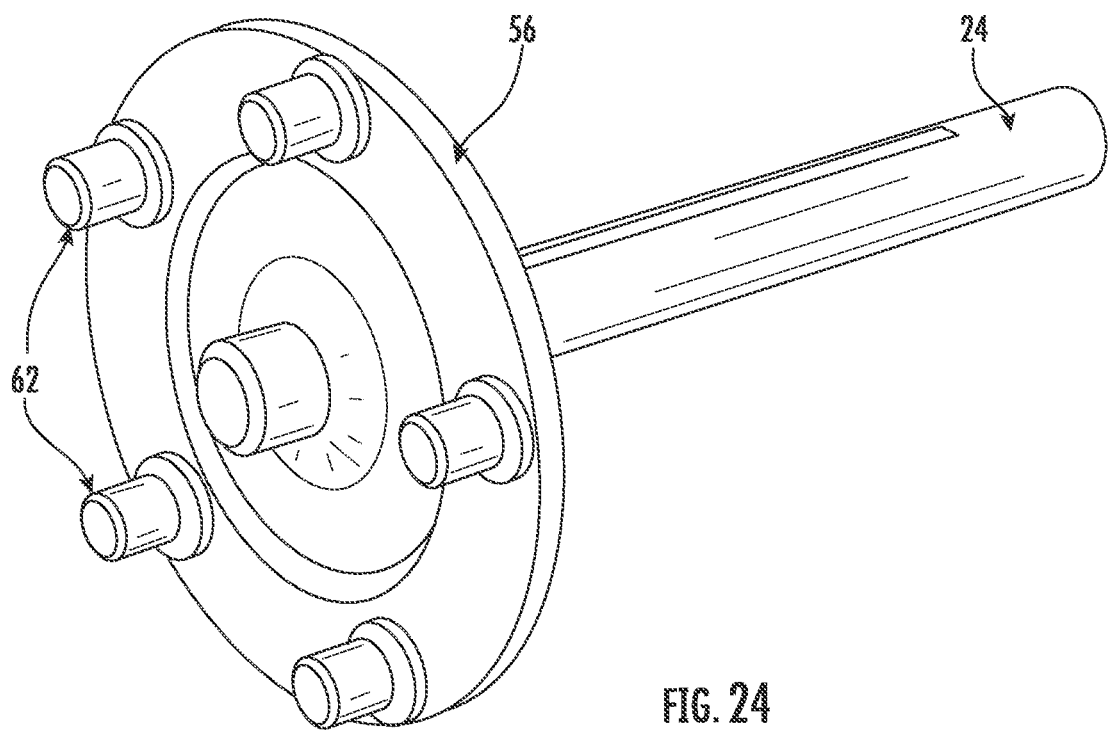
FIG. 24 is a perspective view of the axle and gear carrier of FIG. 22, according to an exemplary embodiment.

Referring now to FIG. 24, illustrated therein is an exemplary embodiment of carrier 24. In this embodiment, carrier 24 includes gear carrier 56, which extends radially from the primary axis of carrier 24. Protruding from gear carrier 56 are several posts 62, upon which planetary gears 58 are disposed, and around which planetary gears 58 axially rotate. In the embodiment illustrated in FIG. 24, carrier 24 includes five posts 62, although it is contemplated herein that any number of posts may be utilized, such as for exemplary purposes only and without limitation, 3-6 posts. Further, in one or more embodiments, such as FIG. 24, posts 62 are symmetrically located on gear carrier 56 with respect to each other. It should be understood that while carrier 56 is shown as circular, in other embodiments carrier 56 may be any other suitable shape such as hexagonally shaped, D-shaped, oval shaped, an X-sided polygon, etc.

In one embodiment, carrier 24 has a diameter of 4.63 mm and is created from diecast Zinc, although it is contemplated herein that other diameters, manufacturing methods and/or materials may be utilized and still practice one or more disclosures herein.

Figure 25:
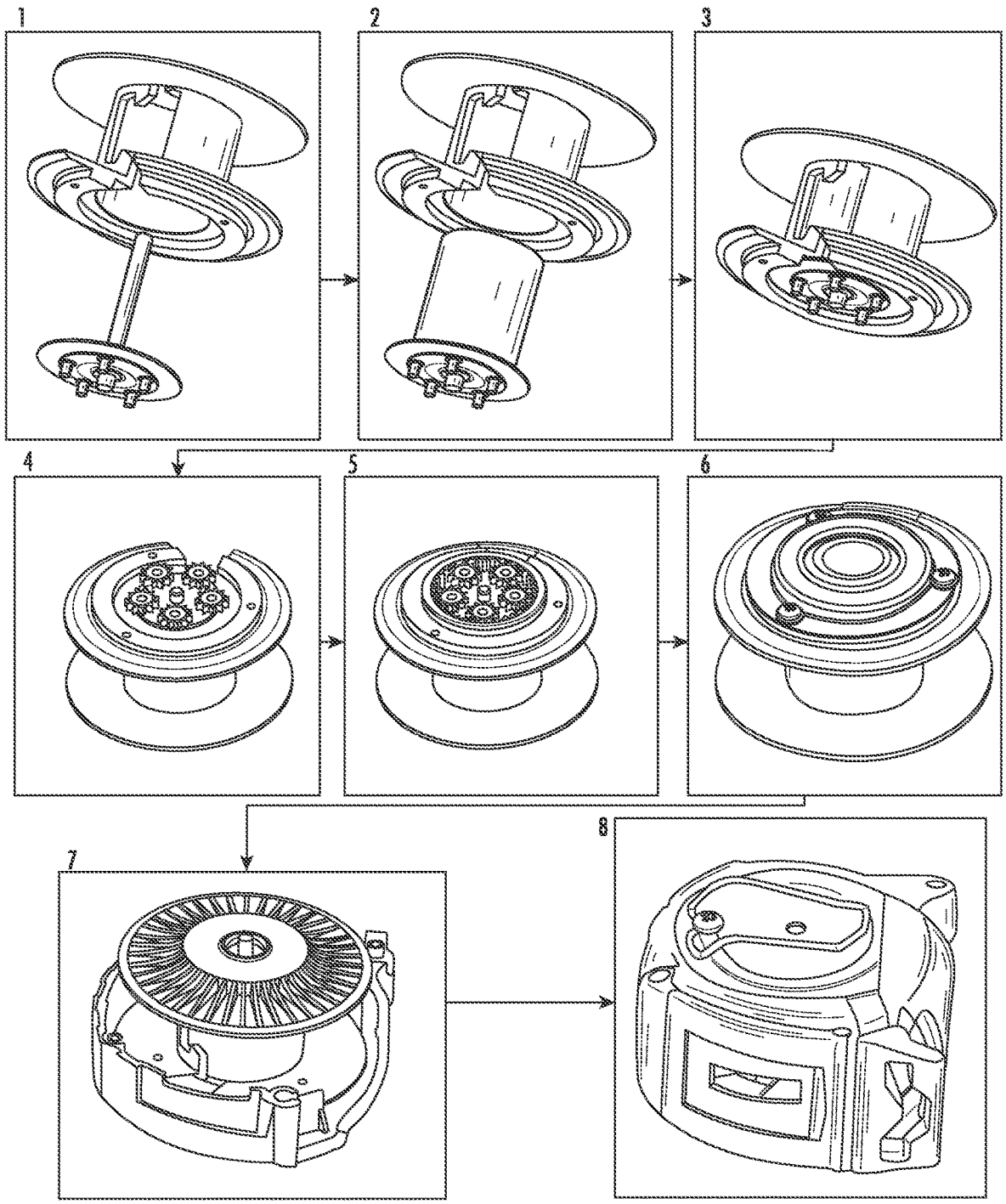
FIG. 25 is a method of manufacturing the tape measure of FIG. 22, according to an exemplary method.

Referring now to FIG. 25, a method of assembly of an epicyclic geared tape measure, such as tape measure 10, is shown. At step 1, one side of membrane 142 is slightly lubricated, such as with grease. Membrane 142 is installed onto carrier 24 with the greased side of membrane 142 facing carrier 24. Spring 26 is formed around the axle of carrier 24 at step 2, and then wound. An external tail of spring 26 is captured, spool 20 is placed around spring 26 at step 3, and the external tail of spring 26 is anchored to spool 20.

Planetary gears 58 are lightly lubricated (e.g., with grease) between planetary gears 58 and posts 62, and then planetary gears 58 are placed on posts 62 at step 4. Outer ring gear 54 is placed around planetary gears 58 and the teeth of planetary gears 58 are lightly lubricated at step 5. At step 6, hubcap 140 is then placed over the gear assembly and fixedly attached to spool 20 (e.g., via screws). Then, at step 7 the spool assembly is placed into housing 12 (e.g., front housing) that includes sun gear 52, such that planetary gears 58 are interfaced with sun gear 52. Subsequently, at step 8 the rest of tape measure 10 is assembled, such as attaching a rear housing, a bumper, a brake, and/or housing screws to attach the housings.

The relative rotational speed of arbor 24 to spool 20 is partly based on whether tape blade 18 and spring 26 are wound in the same direction. To demonstrate a result of winding blade 18 and spring 26 in different directions, two embodiments are described below. In both embodiments, spring 26 is anchored to spool 20 on one end and to arbor 24 on the other end. In use, spool 20 and arbor 24 rotate in the same direction as each other when tape blade 18 is being either extracted or retracted. Spool 20 and arbor 24 are both coupled to housing 12 through gear train 42. Tape blade 18 is wound around spool 20, and when tape blade 18 is extended from housing 12, energy is stored in spring 26 through the rotations of arbor 24 and spool 20.

In a first embodiment, spring 26 and tape blade 18 are wound in the same direction and as a result spool 20 rotates faster than arbor 24. For example, if a 4:1 gear ratio is used with this embodiment then spool 20 rotates 4 times while arbor 24 rotates 3 times, and the result is one turn of force is applied to spring 26 (instead of 4 turns as in a typical tape measure in which housing 12, spring 26, spool 20, and arbor 24 are in series).

In a second embodiment, case spring 26 and tape blade 18 are wound in opposite directions and as a result, arbor 24 rotates faster than spool 20. For comparison, if a 4:1 gear ratio is used with this embodiment then spool 20 rotates 4 times while arbor 24 rotates 5 times, and the result is one turn applied to the spring (instead of 4 turns as in a typical tape measure).

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A tape measure comprising:
   a housing;
   an axle rotatably mounted within the housing;
   a tape reel rotatably mounted within the housing around the axle, the tape reel comprising a radially outward-facing surface;
   an elongate tape blade wound around the radially outward-facing surface of the tape reel, both the axle and the tape reel rotating within the housing during extension and rewinding of the elongate tape blade with respect to the housing;
   a hook coupled to an outer end of the elongate tape blade;

a retraction system configured to drive rewinding of the elongate tape blade on the tape reel; and a gear train comprising an input coupled to the tape reel and an output coupled to the axle, wherein the retraction system and the gear train are configured to provide a pre load torque between the tape reel and the axle between 0.5 and 2.5 in-lbf.

2. The tape measure of claim 1, wherein the gear train is configured such that a Spring Turn Ratio is greater than 1.

3. The tape measure of claim 1, wherein the retraction system and the gear train are configured to rotate the tape reel at a rotation speed of between 500 rpm and 900 rpm during retraction.

4. The tape measure of claim 1, wherein the input of the gear train comprises a first rotatable component coupled to the tape reel and the output of the gear train comprises a second rotatable component coupled to the axle.

5. The tape measure of claim 1, wherein the tape reel comprises a radially inward-facing surface that engages a radially outward-facing of the axle.

6. The tape measure of claim 1, wherein during extension of the elongate tape blade from the housing, a ratio of tape reel rotations to axle rotations is greater than 1.2:1 and less than 1.5:1.

7. The tape measure of claim 1, wherein a maximum torque generated by the retraction system reacting between the tape reel and the axle is between 6 and 12 in-lbf.

8. The tape measure of claim 1, wherein the gear train comprises:
an outer ring gear rigidly coupled to the tape reel;
an inner ring gear rigidly coupled to the axle;
a plurality of posts rigidly coupled to the housing; and
a plurality of planetary gears rotatably mounted to the plurality of posts, the plurality of planetary gears each comprising a low gear section and a high gear section, wherein the low gear section rotatably engages with the inner ring gear and the high gear section rotatably engages with the outer ring gear.

9. The tape measure of claim 8, wherein each low gear section has a smaller outer diameter than each high gear section.

10. The tape measure of claim 1, wherein the gear train comprises a first planetary gear train located on a first side of the tape reel and a second planetary gear train located on a second side of the tape reel.

11. A tape measure comprising:
a housing;
an axle rotatably mounted within the housing;
a tape reel rotatably mounted within the housing around the axle, the tape reel comprising a radially outward-facing surface;
an elongate tape blade wound around the radially outward-facing surface of the tape reel, both the axle and the tape reel rotating within the housing during extension and rewinding of the elongate tape blade with respect to the housing;
a hook coupled to an outer end of the elongate tape blade;
a retraction system configured to drive rewinding of the elongate tape blade on the tape reel; and
a gear train comprising an input coupled to the tape reel and an output coupled to the axle;
wherein a maximum torque generated by the retraction system reacting between the tape reel and the axle is between 3 and 20 in-lbf.

12. The tape measure of claim 11, wherein the retraction system and the gear train are configured to rotate the tape reel at a rotation speed of between 200 rpm and 1500 rpm during retraction.

13. The tape measure of claim 11, wherein the tape reel comprises a radially inward-facing surface that engages a radially outward-facing of the axle.

14. The tape measure of claim 11, wherein the retraction system and the gear train are configured to provide a pre load torque between the tape reel and the axle between 1.0 and 1.4 in-lbf.

15. The tape measure of claim 11, wherein the axle comprises a gear carrier that extends radially outward from an end of the axle, the gear carrier comprises a plurality of posts extending along an axis parallel to a primary axis of the axle, and the gear train comprises:
a sun gear fixedly coupled to the housing;
an outer ring gear coupled to the tape reel; and
a plurality of planetary gears rotatably mounted to the plurality of posts, the plurality of planetary gears rotatably engaging with the outer ring gear and the sun gear.

16. A tape measure comprising:
a housing;
an axle rotatably mounted within the housing;
a tape reel rotatably mounted within the housing around the axle, the tape reel comprising a radially inward-facing surface defining an interior reel cavity and a radially outward-facing surface;
an elongate tape blade wound around the radially outward-facing surface of the tape reel;
a spring located within the interior reel cavity, the spring comprising an outer end coupled to the tape reel and an inner end coupled to the axle, wherein, when the elongate tape blade is unwound from the tape reel to extend from the housing, the spring stores energy, and the spring releases energy driving rewinding of the elongate tape blade on to the tape reel;
a retraction system configured to drive rewinding of the elongate tape blade on the tape reel; and
a gear train comprising an input coupled to the tape reel and an output coupled to the axle;
wherein during extension of the elongate tape blade from the housing, a ratio of tape reel rotations to axle rotations is greater than 1.1:1 and less than 1.6:1.

17. The tape measure of claim 16, wherein the retraction system and the gear train are configured to provide a pre load torque between the tape reel and the axle between 1.0 and 1.4 in-lbf.

18. The tape measure of claim 16, wherein the input of the gear train comprises a first rotatable component coupled to the tape reel and the output of the gear train comprises a second rotatable component coupled to the axle.

19. The tape measure of claim 16, wherein the retraction system and the gear train are configured to rotate the tape reel at a rotation speed of between 500 rpm and 900 rpm during retraction.

20. The tape measure of claim 16, wherein a maximum torque generated by the retraction system reacting between the tape reel and the axle is between 6 and 12 in-lbf.

* * * * *